US009096960B2

(12) United States Patent
Biegler et al.

(10) Patent No.: US 9,096,960 B2
(45) Date of Patent: *Aug. 4, 2015

(54) APPARATUS AND METHODS FOR IMPINGING FLUIDS ON SUBSTRATES

(76) Inventors: Kristopher K. Biegler, Minneapolis, MN (US); Jorge A. Ferreiro, Capital Federal (AR); Michael R. Gorman, Lake Elmo, MN (US); Victor F. Panza, Buenos Aires (AR); Omar A. Parodi, Buenos Aires (AR); Gabriela F. Serra, Capital Federal (AR); William C. Unruh, Inver Grove Heights, MN (US)

(*) Notice: Subject to any disclaimer, the term of this patent is extended or adjusted under 35 U.S.C. 154(b) by 830 days.

This patent is subject to a terminal disclaimer.

(21) Appl. No.: 12/974,329

(22) Filed: Dec. 21, 2010

(65) Prior Publication Data

US 2011/0147475 A1      Jun. 23, 2011

Related U.S. Application Data

(60) Provisional application No. 61/288,959, filed on Dec. 22, 2009.

(51) Int. Cl.
| | | |
|---|---|---|
| *D04H 1/485* | (2012.01) | |
| *D04H 11/08* | (2006.01) | |
| *B29C 65/10* | (2006.01) | |

(Continued)

(52) U.S. Cl.
CPC .............. *D04H 1/485* (2013.01); *B29C 65/103* (2013.01); *B29C 66/474* (2013.01); *B29C 66/729* (2013.01); *B29C 66/7294* (2013.01); *B29C 66/73921* (2013.01); *B29C 66/8145* (2013.01); *B29C 66/83415* (2013.01); *B29C 66/9121* (2013.01); *B29C 66/9141* (2013.01); *B29C 66/91431* (2013.01); *D04H 11/08* (2013.01); *B29C 66/002* (2013.01); *B29C 66/21* (2013.01);

(Continued)

(58) Field of Classification Search
CPC .... B32B 38/0036; B32B 37/00; B32B 37/06; B29C 65/10; B29C 65/103
USPC ................. 134/15, 21, 27; 156/497, 320, 322
See application file for complete search history.

(56) References Cited

U.S. PATENT DOCUMENTS 3,210,227 A  * 10/1965  Shichman ........................ 156/82
3,843,480 A  * 10/1974  Dreher ............................ 428/354

(Continued)

FOREIGN PATENT DOCUMENTS

| DE | 296 17 525 | 12/1996 |
|---|---|---|
| DE | 29617525 U1 * | 12/1996 |
| JP | 2006-027178 A | 2/2006 |

OTHER PUBLICATIONS

Biegler; U.S. Appl. No. 12/974,536, filed Dec. 21, 2010.

(Continued)

*Primary Examiner* — Nicole Blan

(57) ABSTRACT

Herein are disclosed apparatus and methods for impinging fluids, e.g. heated fluids, onto the surface of substrates and then locally removing the impinged fluid. The apparatus may comprise at least first and second fluid delivery outlets that are in diverging relation to each other. The apparatus may comprise at least first and second fluid capture inlets that are locally positioned relative to the first and second fluid delivery outlets, respectively. The apparatus and method may be used e.g. to impinge fluids onto two converging substrates and may be used to heat the surfaces of the substrates so as to facilitate melt-bonding the substrates to each other.

16 Claims, 8 Drawing Sheets

(51) Int. Cl.
*B29C 65/00* (2006.01)
*B29L 31/48* (2006.01)

(52) U.S. Cl.
CPC ... *B29C 66/83413* (2013.01); *B29L 2031/4878* (2013.01)

(56) References Cited

U.S. PATENT DOCUMENTS

| | | |
|---|---|---|
| 4,622,917 A | 11/1986 | Schramm |
| 4,915,763 A * | 4/1990 | Swiszcz ............ 156/209 |
| 5,063,951 A | 11/1991 | Bard |
| 5,147,690 A | 9/1992 | Faust |
| 5,571,368 A * | 11/1996 | Barge ............ 156/359 |
| 5,614,264 A | 3/1997 | Himes |
| 5,660,224 A | 8/1997 | Barbe |
| 5,916,413 A | 6/1999 | Johnson et al. |
| 5,976,249 A | 11/1999 | Stahl |
| 6,066,221 A | 5/2000 | Marmon |
| 6,256,903 B1 | 7/2001 | Rudd |
| 2003/0099769 A1 | 5/2003 | Mandai |
| 2004/0068848 A1 * | 4/2004 | Ausen et al. ............ 24/452 |
| 2004/0251583 A1 | 12/2004 | Park |
| 2006/0248745 A1 | 11/2006 | Viswanath |
| 2009/0294106 A1 | 12/2009 | Flotta |

OTHER PUBLICATIONS

International Search Report, PCT/US2010/061237, mailed Aug. 25, 2011, 3 pages.
Extended European Search Report, EP10 84 3514.0, mailed Aug. 13, 2012, 3 pages.

* cited by examiner

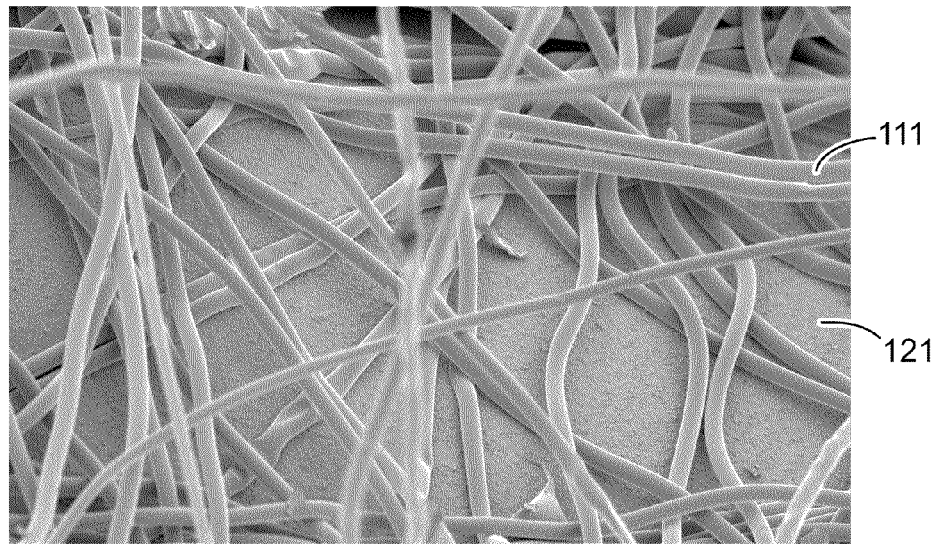
*Fig. 5*  100μm
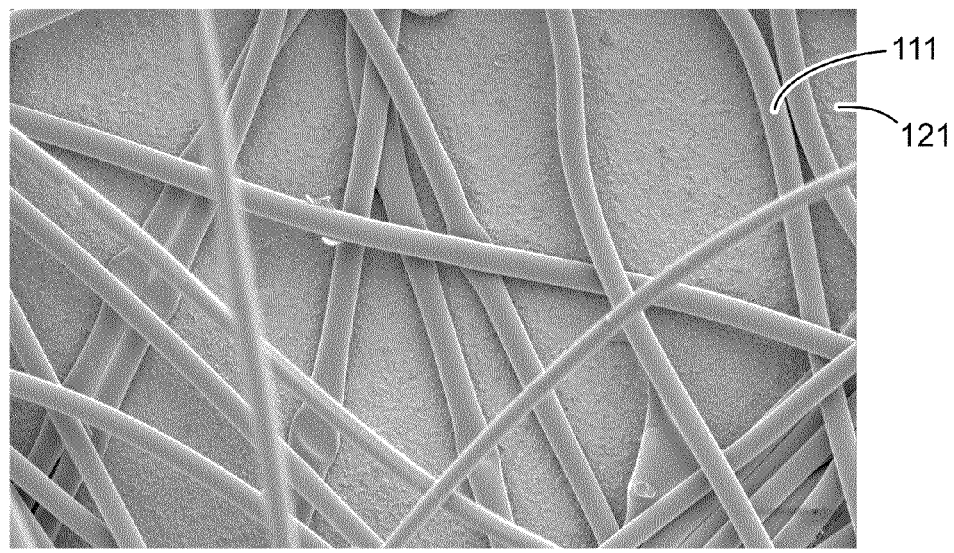
*Fig. 6*  100μm

APPARATUS AND METHODS FOR IMPINGING FLUIDS ON SUBSTRATES

CROSS REFERENCE TO RELATED APPLICATION

This application claims the benefit of U.S. Provisional Patent Application No. 61/288,959, filed Dec. 22, 2009, the disclosure of which is incorporated by reference herein in its entirety.

BACKGROUND

Fluids, e.g. heated fluids, are often impinged upon a substrate for a variety of purposes. For example, heated fluids may be impinged upon a substrate for purposes of annealing, drying of a surface coating, promoting a chemical reaction or a physical change, and the like. Often, the impinged fluid is allowed to escape into the surrounding atmosphere, where it may be allowed to disperse or may be at least partially removed by a duct, hood, or the like.

SUMMARY

Herein are disclosed apparatus and methods for impinging fluids, e.g. heated fluids, onto the surface of substrates and then locally removing the impinged fluid. The apparatus may comprise at least first and second fluid delivery outlets that are in diverging relation to each other. The apparatus may comprise at least first and second fluid capture inlets that are locally positioned relative to the first and second fluid delivery outlets, respectively. The apparatus and method may be used e.g. to impinge fluids onto two converging substrates and may be used to heat the surfaces of the substrates so as to facilitate melt-bonding the substrates to each other.

In one aspect, disclosed herein is an apparatus for impinging fluid onto at least a first surface of a first moving substrate and a first surface of a second moving substrate and locally removing the impinged fluid, comprising: at least one first fluid delivery outlet; at least one first fluid capture inlet that is locally positioned relative to the first fluid delivery outlet; at least one second fluid delivery outlet; at least one second fluid capture inlet that is locally positioned relative to the second fluid delivery outlet; and wherein the at least one first fluid delivery outlet and the at least one second fluid delivery outlet are in diverging relation.

In another aspect, disclosed herein is a method of impinging heated fluid onto, and locally removing the impinged fluid from, a first surface of a first moving substrate and a first surface of a second moving substrate, the method comprising: providing at least one first fluid delivery outlet and at least one first fluid capture inlet that is locally positioned relative to the first fluid delivery outlet; providing at least one second fluid delivery outlet and at least one second fluid capture inlet that is locally positioned relative to the second fluid delivery outlet; passing the first moving substrate by the first fluid delivery outlet and impinging heated fluid from the first outlet onto the first major surface of the first moving substrate; passing the second moving substrate by the second fluid delivery outlet and impinging heated fluid from the second outlet onto the first major surface of the second moving substrate; and, locally capturing at least 60% of the total volumetric flow of impinged fluid by way of the fluid capture inlets and removing the locally captured fluid through fluid removal channels that are fluidly connected to the fluid capture inlets; and wherein the first and second moving substrates are converging substrates.

BRIEF DESCRIPTION OF THE DRAWINGS

FIG. 5 is a scanning electron micrograph taken at 130×magnification, of an exemplary laminate comprising a nonwoven fibrous web surface-bonded to a substrate.

FIG. 6 is a scanning electron micrograph taken at 180×magnification, of an exemplary laminate comprising a nonwoven fibrous web surface-bonded to a substrate.

Like reference numbers in the various figures indicate like elements. Some elements may be present in similar or identical multiples; in such cases the elements may comprise the same reference number, with one or more of the elements designated by a prime (') for convenience of description. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", "bottom", "upper", "lower", "under", "over", "front", "back", "outward", "inward", "up" and "down", and "first" and "second" may be used in this disclosure, it should be understood that those terms are used in their relative sense only unless otherwise noted.

DETAILED DESCRIPTION

Figure 1:
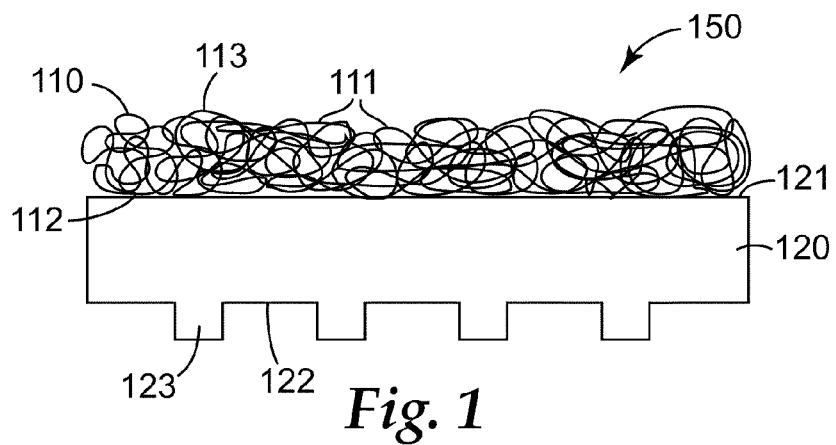
FIG. 1 is a side view of an exemplary laminate comprising an exemplary fibrous web that is surface-bonded to an exemplary substrate with a loft-retaining bond.

Shown in FIG. 1 is a side perspective view of an exemplary laminate 150 comprising fibrous web 110 that is bonded to substrate 120. Fibrous web 110 is comprised of fibers 111, and comprises first major surface 112 and second, oppositely-facing major surface 113. (Those of ordinary skill in the art will recognize that surfaces 112 and 113 of web 110 may not be perfectly planar and/or continuous physical surfaces since they are collectively defined by outwardmost portions of certain fibers 111 of web 110). Laminate 150 further comprises substrate 120, which comprises first major surface 121 and second, oppositely-facing major surface 122. Substrate 120 may optionally comprise protrusions 123 that protrude from major surface 122.

Figure 2:
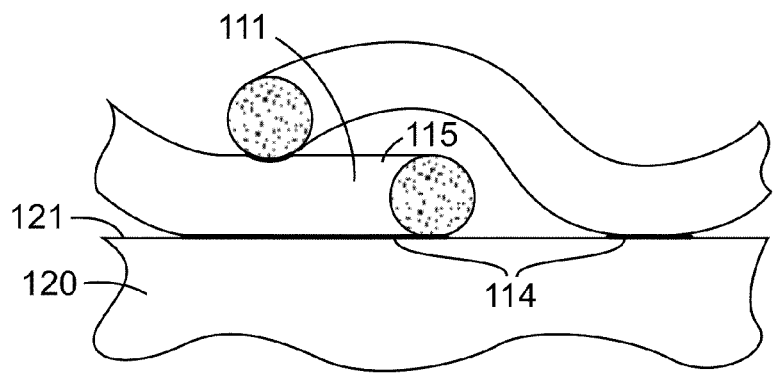
FIG. 2 is an illustrative depiction, in side schematic view in partial cross section, of a portion of a laminate comprising a fibrous web with fiber portions surface-bonded to a substrate.

In the illustrated embodiment, fibrous web 110 is surface-bonded to substrate 120 (specifically, first major surface 112 of fibrous web 110 is surface-bonded to first major surface 121 of substrate 120). By this is meant that fibrous web 110 is attached to substrate 120 by way of some fibers 111 of surface 112 of web 110 being surface-bonded to first major surface 121 of substrate 120. As shown in an illustrative manner in FIG. 2, the designation that fibers 111 are surface-bonded to first major surface 121 of substrate 120 means that parts of fiber surfaces 115 of fiber portions 114 of fibers 111 are melt-bonded to first major surface 121 of substrate 120, in such a manner as to substantially preserve the original (pre-bonded) shape of first major surface 121 of substrate 120, and to substantially preserve at least some portions of first major surface 121 of substrate 120 in an exposed condition, in the surface-bonded area.

Figure 3:
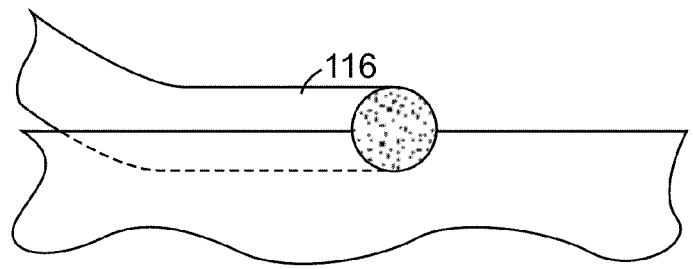
FIG. 3 is an illustrative depiction, in side schematic view in partial cross section, of a portion of a laminate comprising a fibrous web with a fiber portion embedded in a substrate.

The requirement that surface bonding substantially preserves the original shape of first major surface 121 means that surface-bonded fibers may be distinguished from fibers that are bonded to a substrate in a manner that results in fiber portions being embedded (e.g., partially or completely encapsulated) within the substrate (as shown in an illustrative manner in FIG. 3) by way of at least partial penetration of the fibers into the substrate, deformation of the substrate, and the like. Quantitatively, surface-bonded fibers may be distinguished from embedded fibers 116 by way of at least about 65% of the surface area of the surface-bonded fiber being visible above the surface of the substrate in the bonded portion of the fiber (although inspection from more than one angle may be necessary to visualize the entirety of the surface area of the fiber). The substantial preservation of the original (pre-bonded) shape of substrate 120 may also be manifested by the absence of any gross change in the physical shape of first major surface 121 (e.g. wrinkling, buckling, penetration of portions of substrate 120 into the interstitial spaces of web 110, etc.).

The requirement that surface bonding substantially preserves at least some portions of first major surface 121 in an exposed condition means that surface-bonded fibers may be distinguished from fibers that are bonded to a substrate in a manner that results in the fibers being sufficiently melted, densified, compacted, commingled etc., so as to form a continuous bond. By continuous bond is meant that fibers immediately adjacent to first major surface 121 of substrate 120 have commingled and/or densified sufficiently (e.g., melted together so as to partially or completely lose their identity as individual fibers) to form a continuous layer of material atop, and in contact with, first major surface 121. (Those of ordinary skill in the art will recognize the possibility of occasional voids and the like in a "continuous" layer, and will appreciate that in this context the term continuous can be interpreted to mean that, in a bonded area, the continuous, densified-fiber layer is atop, and in contact with, at least about 95% of the area of first major surface 121 of substrate 120). Thus, surface-bonded fibers can be distinguished from fibers bonded in a continuous bond, by the presence of numerous exposed areas in which first major surface 121 of substrate 120 is visible between the surface-bonded fibers that make up first major surface 112 of fibrous web 110.

Scanning electron micrographs (at 130× and 180× magnification, respectively) of exemplary nonwoven fibrous webs surface-bonded to substrates are shown in FIGS. 5 and 6. In these micrographs, the above-described surface bonding of fiber portions to the surface of the substrate is readily apparent, with minimal deformation or damage to the bonded fiber portions or to the substrate, and with numerous exposed areas of the surface of the substrate being visible amongst the surface-bonded fibers.

As defined herein, the term surface-bonded means that a web is melt-bonded to a substrate primarily by the above-described surface-bonded fiber portions, and furthermore means that in the absence of such surface bonds the fibrous web and the substrate would not remain bonded together. Those of ordinary skill in the art will recognize that the term surface-bonded as used in this manner does not encompass situations in which the primary bonding between a fibrous web and a substrate is by some other melt-bonding mechanism (e.g., by embedding of fibers into the substrate, and the like), with surface-bonded fiber portions only being found occasionally within the bonded area or areas of the web. Those of ordinary skill in the art will thus appreciate that surface-bonding as described herein does not encompass such melt-bonding as is commonly achieved e.g. by ultrasonic bonding, by compression bonding (e.g., as achieved by passing substrates through a heated nip at relatively high pressure), by extrusion-lamination and the like. Such processes are well-known to result in large-scale deformation and/or physical changes of the fiber portions and/or the substrate, in the formation of the bond. Those of ordinary skill in the art will further appreciate that fibrous webs that are bonded to substrates that are still in a molten, semi-molten, soft, etc. state, (such as extruded materials that have not yet cooled e.g. to a solid condition), may not comprise surface bonding, since bonding to a substrate that is still at such a high temperature and/or is still considerably deformable, may cause the fibers to become embedded, may cause the formation of a continuous bond, or both.

Those of skill in the art will further recognize that while embedded fiber portions, small-scale quasi-continuously bonded regions, and the like, may occasionally occur in a web that has been surface-bonded to a substrate as described herein, such features may represent only the inherent sporadic occurrence of such features in the bonding process. As stated above, the term surface-bonded means that while such embedded fiber portions and/or quasi-continuously bonded fiber regions may be present to a small extent, the majority of the bonds between fiber portions and the substrate are surface bonds, such that in the absence of such surface bonds, any adventitious bonding by way of embedded fibers and/or quasi-continuously bonded regions would be so weak that the fibrous web and the substrate would not remain bonded together.

Those of ordinary skill in the art will still further recognize that while surface-bonding of fiber portions to a substrate as described herein may lead to individual bonds that are weaker than bonds obtained by embedding fibers within the substrate or continuously bonding fibers to the substrate, surface-bonding as described herein may nevertheless provide an acceptable bond between a fibrous web and a substrate if performed over a sufficiently large area or areas. That is, surface-bonding may be advantageously performed over a large area or areas (herein termed "area-bonding"), as opposed to the small-area bonding (often called point-bonding) that is often achieved by ultrasonic bonding and the like. Such area-bonding means that the large number of surface-bonded fiber portions (that may be randomly and/or uniformly present over the bonded area) can collectively provide adequate bond strength for laminate 150 to be handled and to perform satisfactorily in various end uses. In various embodiments, such surface bonded areas between fibrous web 110 and substrate 120 may each comprise an area of at least about 100 square mm, at least about 400 square mm, or at least 1000 square mm. One of ordinary skill in the art will thus again be able to readily distinguish such area-bonding from the local or point bonding that is often employed in other melt-bonding processes.

At least by the methods disclosed herein, surface-bonding can be easily performed over a large proportion of the area of overlap or contact between a fibrous web and a substrate. Specifically, fibrous web 110 and substrate 120 may comprise an overlapped area (e.g., in which first surface 112 of web 110, and first surface 121 of substrate 120, are facing each other and/or are in contact with each other). Of this overlapped area, at least about 70%, at least about 80%, at least about 90%, or substantially all, may comprise surface-bonded area or areas.

Surface-bonding as disclosed herein may provide advantages over other melt-bonding methods. Specifically, within the bonded area, surface-bonding may minimize any deformation of substrate 120 and may minimize the number of fibers 111 that are embedded within substrate 120 and/or are continuously bonded to substrate 120. Thus, laminate 150 may remain quite flexible even in the bonded area.

Surface-bonding as disclosed herein may be performed to the point that substrate 120 and fibrous web 110 are not separable from each other, at all or without severely damaging one or both of substrate 120 and fibrous web 110.

Figure 4:
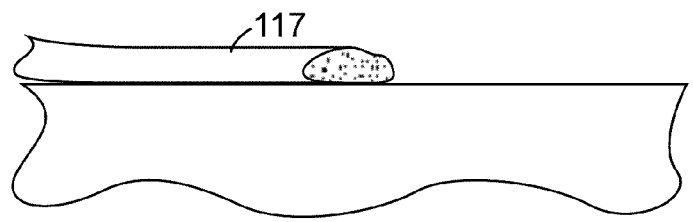
FIG. 4 is an illustrative depiction, in side schematic view in partial cross section of a laminate comprising a fibrous web with a fiber portion fused to a substrate.

In some embodiments, surface-bonded fibers may generally, or substantially, retain their original (pre-bonded) shape. In such embodiments, shape-retaining surface-bonded fibers may be distinguished from fibers that are bonded to a substrate by way of a fiber portion being fused to the substrate, (with the term fused meaning that in the bonding process the fiber portion has become substantially deformed from its original pre-bonded physical structure and shape, e.g. the fiber portion has become substantially flattened), as shown in an illustrative manner in FIG. 4. Quantitatively, shape-retaining surface-bonded fibers may be distinguished from fused fibers 117 by way of the surface-bonded fibers remaining sufficiently circular in cross section as to exhibit an aspect ratio (i.e., ratio of the largest cross sectional dimension of the fiber to the smallest cross sectional dimension) in the bonded portion of the fiber of no more than about 2.5:1 (as obtained by an average based on a number of representative fibers). In various embodiments, the fibers may comprise an aspect ratio of no more than about 2:1, or no more than about 1.5:1. Those of ordinary skill in the art will realize that this method of identification of shape-retaining surface-bonded fibers may only be appropriate for fibers of generally circular cross sectional shapes as originally made; if fibers of other shapes are used, it may be necessary to compare the cross sectional shape of the fibers as originally made to the shape after a bonding operation, in order to make the determination. Also, those of ordinary skill in the art will recognize that some deformation of the cross sectional shape of some portion of some shape-retaining surface-bonded fibers may occasionally occur due to the presence of other fibers in contact with portions of the fiber while the fibers are at a high temperature (some such occurrences are visible in FIG. 6). Shape-retaining surface-bonded fibers that exhibit deformation for this reason should not be equated with fused fibers.

In the illustrated embodiment of FIG. 1, fibrous web 110 is bonded to substrate 120 by way of a loft-retaining bond. By this is meant that fibrous web 110 is melt-bonded to substrate 120 such that fibrous web 110 retains a significant amount of the loft exhibited by fibrous web 110 prior to the bonding process. Loft is a term of art with regard to fibrous webs, and is a measure of the degree of openness, lack of compaction, presence of interstitial spaces, etc., within a fibrous web. As such, any common measure of loft may be used. For convenience, herein the loft of a fibrous web will be represented by the ratio of the total volume occupied by the web (including fibers as well as interstitial spaces of the web that are not occupied by fibers) to the volume occupied by the material of the fibers alone. Using this measure, a loft-retaining bond as described herein is defined as one in which bonded fibrous web 110 comprises a loft that is at least 80% of the loft exhibited by the web prior to, or in the absence of, the bonding process. If only a portion of fibrous web 110 has substrate 120 bonded thereto, the retained loft can be easily ascertained by comparing the loft of the web in the bonded area to that of the web in an unbonded area. If the entirety of fibrous web 110 has substrate 120 bonded thereto (or if the web in an unbonded area has also undergone compaction during the bonding process), it may be necessary to compare the loft of the bonded web to that of a sample of the same web prior to being bonded. In various embodiments, laminate 150 comprises a loft-retaining bond such that fibrous web 110 comprises at least 90%, at least 95%, or substantially all, of its prebonded loft.

Those of ordinary skill in the art will recognize that in some embodiments laminate 150 may not comprise a surface-bonded laminate as described herein (e.g., a significant number of fibers 111 comprising first major surface 112 of fibrous web 110 may be embedded within substrate 120 and/or continuously bonded to substrate 120), but in such cases fibrous web 110 may nevertheless be bonded to substrate 120 in a loft-retaining bond.

Loft-retaining bonding as disclosed herein may provide advantages over other melt-bonding methods. Specifically, within the bonded area, loft-retaining bonding may leave the fibers of fibrous web 110 that are not on first major surface 112 of web 110 intact and/or not melt-bonded to substrate 120. Thus, fibrous web 110 may remain lofty, resilient and/or flexible even in the bonded area (in such cases, fibrous web 110 may be more easily engageable by male fastening elements, may present a more pleasing tactile feel and/or appearance, etc). In contrast, other bonding methods may disadvantageously crush or densify most or all of the fibers in the bonded area and/or may melt-bond them to the substrate, with loss of desirable properties such as loft and flexibility. Those of ordinary skill in the art will thus appreciate that loft-retained bonding as described herein does not encompass such melt-bonding as is commonly achieved e.g. by ultrasonic bonding, by compression bonding (e.g., as achieved by passing substrates through a heated nip at relatively high pressure), by extrusion-lamination and the like, when such processes result in significant crushing and/or densification of the bonded web.

Those of ordinary skill in the art will recognize that other bonding methods, e.g. supplemental point bonding, may be used in certain locations of the laminate in addition to the herein-described surface bonding and/or loft-retained bonding, e.g., if desired to enhance the overall bonding.

While methods presented herein (e.g., impingement of heated fluid upon the surfaces of two converging substrates; or, impingement of heated fluid upon the surfaces of two converging substrates with local removal of the impinged heated fluid) may be particularly suitable for the production of surface-bonded laminates, loft-retained bonded laminates, or both, those of ordinary skill in the art will appreciate, based on the disclosures herein, that other methods may also be suitable. Such methods may include any process by which heat can be imparted to the first surfaces of two substrates such that the first surfaces of the two substrates may be melt-bonded together to achieve the structures described herein.

Substrate 120 may be any substrate to which it is desired to surface-bond fibrous web 110. Substrate 120 may be made of any suitable thermoplastic polymeric material (e.g., a material that is melt-bondable). Such materials may include e.g. polyolefins, polyesters, polyamides, and various other materials. Examples of suitable polyolefins include polyethylene, polypropylene, polybutylene, ethylene copolymers, propylene copolymers, butylene copolymers, and copolymers and blends of these materials. The substrate may comprise various additives and the like, as are well known in the art, as long as such additives do not unacceptably reduce the ability of the substrate to be melt bonded. Substrate 120 may be multilayer, e.g. a coextruded multilayer film, as long as first major surface 121 is able to be melt-bonded to at least some of the fibers of fibrous web 110.

In some embodiments, substrate 120 may comprise a preformed substrate, by which is meant that substrate 120 is a pre-existing, previously-made film whose physical properties have generally fully developed. This should be contrasted e.g. with a case in which a substrate is made (e.g., extruded) and taken generally directly into the herein-described bonding process in a condition in which it is still generally molten, semi-molten, soft, or the like.

Substrate 120 may be any desired thickness. In various embodiments, the thickness of substrate 120 (not including the height of the protrusions) may be less than about 400 microns, less than about 200 microns, less than about 100 microns, or less than about 50 microns. In some embodiments, substrate 120 does not comprise any adhesive (i.e., hot melt adhesive, pressure sensitive adhesive, and the like) e.g. in the form of coatings on a major surface of the web.

In some embodiments, substrate 120 may be continuous, i.e. without any through-penetrating holes. In other embodiments, substrate 120 may be discontinuous, e.g. comprising through-penetrating perforations and the like. In some embodiments, substrate 120 may be comprised of a dense, nonporous material. In some embodiments, substrate 120 may be comprised of a porous material. In particular embodiments, substrate 120 may comprise a fibrous web, e.g. a nonwoven fibrous web.

In some embodiments, first major surface 121 and second, oppositely-facing major surface 122 of substrate 120 may be free of protrusions. In other embodiments, optional protrusions 123 may protrude from second major surface 122 of substrate 120, as shown in the exemplary design of FIG. 1. (In this particular design, protrusions 123 are on the opposite side of substrate 120 from the side that is to be bonded). Protrusions 123 can be of any desired type, shape or design, present at any desired density per area of substrate 120, as desired for any suitable purpose. Protrusions 123 may be integral with (that is, of the same composition, and formed at the same time with as a unit) substrate 120.

In various embodiments, protrusions 123 may comprise a maximum height (above surface 122) of at most about 3 mm, about 1.5 mm, about 0.8 mm, or about 0.4 mm. In additional embodiments, protrusions 123 may comprise a minimum height of at least about 0.05 mm, about 0.1 mm, or about 0.2 mm. In various embodiments, protrusions 123 may comprise an aspect ratio (the ratio of the protrusion height to the protrusion largest width) of at least about 2:1, at least about 3:1, or at least about 4:1.

In some embodiments, protrusions 123 comprise male fastening elements, e.g. hooks, of the type that are capable of engaging with a fibrous material and which can serve as the hook component of a so-called hook and loop fastening system. Any such male fastening elements can be used. In particular embodiments, fastening elements may be used that each comprise a stem and a relatively large head (that may be e.g. generally mushroom-shaped, a flattened disc, and the like), of the general type described in U.S. Pat. Nos. 6,558, 602, 5,077,870, and 4,894,060. Suitable substrates with protrusions comprising male fastening elements include e.g. those products available from 3M Company, St. Paul, Minn., under the trade designation CS200 and CS 600. Other suitable substrates include e.g. those described in U.S. Pat. Nos. 7,067,185 and 7,048,984.

Bonding as described herein may be particularly advantageous in the melt-bonding of fibrous web 110 to a substrate 120 that comprises protrusions 123 (in particular, male fastening elements), because the bonding may be able to be performed without significantly damaging (e.g. deforming, crushing, flattening, etc.) the protrusions in the bonded area. Thus, in some embodiments, bonding processes as described herein are performed such that substrate 120 of laminate 150 comprises protrusions 123 that have not been significantly damaged. By not significantly damaged means that upon visual inspection (e.g., by means of a microscope sufficiently powerful to reveal details of individual protrusions), no more than one protrusion in every ten protrusions displays any damage such as deformation, crushing, melting, and the like, when compared to protrusions that have not undergone the bonding process. In further embodiments, fewer than one protrusion in twenty displays damage. In an additional embodiment, substantially all of the protrusions are free of damage. For the particular case in which the protrusions of the substrate are male fastening elements, the absence of significant damage to the protrusions may also be manifested in the retained peel performance of the substrate. For example, when mated with any suitable loop component and subjected to any of the peel tests well-known for quantitatively characterizing the performance of components of hook-and-loop fastening systems, the substrate, after being subjected to the bonding processes described herein, may retain at least at about 80 percent of the peel performance of the substrate as originally made. In various embodiments, the peel performance of the substrate may remain at least at about 90%, or at least at about 95%, of the peel performance of the substrate as originally made. Those of skill in the art will appreciate that many bonding processes significantly or even completely crush all protrusions in the process of achieving a bond and thus will again appreciate the fundamental differences between the bonding methods and bonded laminates disclosed herein, and those in the art.

Fibrous web 110 may be any suitable fibrous web with sufficient mechanical strength to be handled as a self-supporting web and to be subjected to the bonding processes described herein. As such, it will be understood that laminate 150 as described herein does not encompass any article that does not comprise a pre-existing, self-supporting fibrous web that is laminated to a substrate (such non-encompassed articles might include e.g. meltblown fibers deposited onto a scrim, and the like).

In some embodiments, fibrous web 110 may comprise interlaced fibers such as achieved by weaving, knitting, stitching and the like. As such, fibrous web 110 may be comprised of a suitable fabric or textile, as long as the materials comprising the fibers are suitable for the herein-described bonding. Thus, although web 110 may be referred to occasionally herein for convenience of illustration as a nonwoven fibrous web, it is understood that web 110 may comprise any suitable fibrous material.

In some embodiments, fibrous web 110 comprises a nonwoven fibrous web. Any suitable self-supporting nonwoven fibrous web 110 may be used, made of any material as desired, as long as the herein-described bonding can be performed. Nonwoven fibrous web 110 may be e.g. a carded web, spunbonded web, a spunlaced web, an airlaid web, or a meltblown web (i.e., as long as such a web has undergone sufficient processing as to render it self-supporting). Nonwoven fibrous web 110 may be a multilayer material with, for example, at least one layer of a meltblown web and at least one layer of a spunbonded web, or any other suitable combination of nonwoven webs. For instance, nonwoven fibrous web 110 may be a spunbond-meltbond-spunbond, spunbond-spunbond, or spunbond-spunbond-spunbond multilayer material. Or, the web may be a composite web comprising a nonwoven layer and a dense film layer, as exemplified by webs comprising nonwoven fibers bonded in arcuately protruding loops to a dense film backing and available from 3M Company, St. Paul, Minn., under the trade designation Extrusion Bonded Loop.

Fibrous web 110 may be made of any suitable thermoplastic polymeric material (e.g., a material that is melt-bondable). Such materials may include e.g. polyolefins, polyesters, polyamides, and various other materials. Examples of suitable polyolefins include polyethylene, polypropylene, polybutylene, ethylene copolymers, propylene copolymers, butylene copolymers, and copolymers and blends of these materials. Those of ordinary skill in the art will appreciate that the composition of fibrous web 110 may advantageously be chosen so as to enhance the melt-bonding to substrate 120. For example, at least major surface 121 of the substrate, and at least some of the fibers of the fibrous web, may be comprised substantially of e.g. polypropylene.

Fibrous web 110 may have any suitable basis weight, as desired for a particular application. Suitable basis weights may range e.g. from at least about 20, 30 or 40 grams per square meter, up to at most about 400, 100 or 100 grams per square meter. Fibrous web 110 may comprise any suitable loft, as previously described herein. Fibrous web 110 may comprise any suitable thickness. In various embodiments, fibrous web 110 may be at most about 5 mm, about 2 mm, or about 1 mm, in thickness. In further embodiments, fibrous web 110 may be at least about 0.1, about 0.2, or about 0.5 mm in thickness.

In some embodiments, some or all of fibers 111 of fibrous web 110 may comprise monocomponent fibers. In some embodiments, fibrous web 110 may also or instead comprise bicomponent fibers, e.g., that comprise a sheath of lower-melting material surrounding a core of higher melting material. If desired, the sheath material may be chosen so as to enhance its ability to melt-bond to substrate 120. Other fibers (e.g., staple fibers and the like) may be present. In some embodiments, fibrous web 110 does not comprise any adhesive (i.e., hot melt adhesive, pressure sensitive adhesive, and the like) as might be present in the form of adhesive particles, binder or the like, distributed throughout the web or on a major surface of the web. In some embodiments, fibrous web 110 comprises certain fibers with a composition advantageously suitable for the herein-described surface bonding, and other fibers with a composition different from that of the surface-bonding fibers.

In certain embodiments, fibrous web 110 comprises an extended portion that is not in overlapping relation with substrate 120. (By the methods disclosed herein, the exposed surface of the extended portion of fibrous web 110 can remain generally unaffected by heat exposure during the bonding process; that is, the exposed surface is not charred or rendered glassy or any like condition indicative of unacceptably high exposure to heat). Such an extended portion of fibrous web 110 can be used e.g. as an attachment area by which laminate 150 may be attached to an item. One such configuration is shown in exemplary manner in FIG. 7, in which at least one substrate 120 is present as a narrow strip upon a wider width of fibrous web 110. An individual piece 160 of laminate 150 can be removed by cutting along the phantom line shown, with individual piece 160 comprising extended portion 161 that can be used to attach piece 160 to an item. In the particular embodiment shown in FIG. 7, an additional extended portion 162 of fibrous web 110 is provided that extends in the opposite direction from extended portion 161, and may serve e.g. as a fingerlift in the event that piece 160 is used as a hook-bearing component of a hook and loop fastening system (i.e. as a hook-bearing tab). As may be useful in such an application, the exemplary substrate of FIG. 7 comprises protrusions 123 (that may be male fastening elements, for example) that protrude from second major surface 122 of substrate 120.

Figure 7:
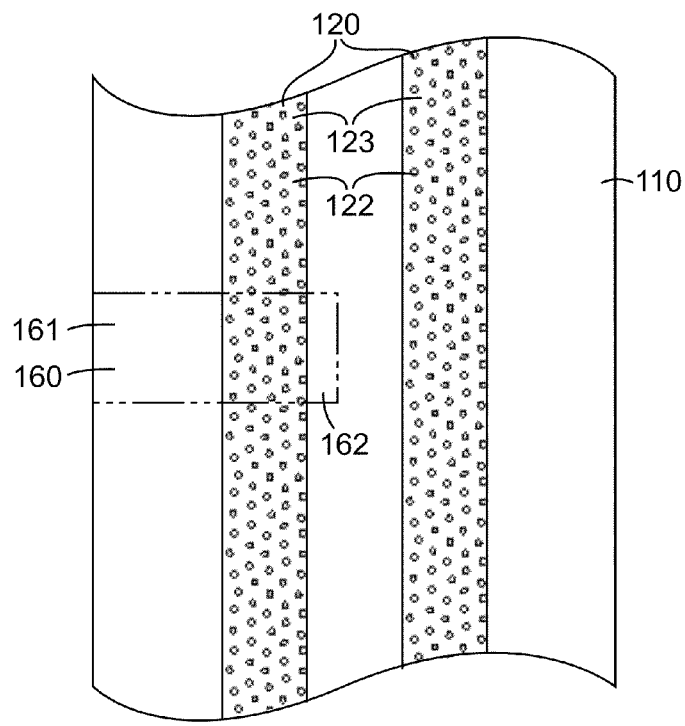
FIG. 7 is a top view of two exemplary substrates bonded to an exemplary fibrous web.

In the particular embodiment illustrated in FIG. 7, substrate 120 is present as two strips upon a wider width of fibrous web 110, with a laterally extended portion of fibrous web 110 outwardly bordering each strip of substrate 120 and with an additional extended portion of fibrous web 110 laterally in between the strips of substrate. From this laminate, individual pieces 160 can be cut, each piece with an attachment portion 161 and a fingerlift portion 162, e.g. for attachment to items such as hygiene articles (e.g., diapers, personal care products, and the like). The attachment of portion 161 to an item may be accomplished by any method known in the art, e.g. ultrasonic bonding, adhesive attachment, etc.

In brief, the bonding processes described herein involve the impinging of heated fluid (i.e., gaseous fluid) onto a first major surface of a first moving substrate and the impinging of heated fluid onto a first major surface of a second moving substrate. In some embodiments, the moving substrates may be converging substrates, meaning that the substrates are moving in a converging path in which the first major surface of the first substrate comes into contact with the first major surface of the second substrate. As disclosed herein, the impinging of heated fluid onto the first surface of a moving substrate can raise the temperature of the first surface of the substrate sufficiently for bonding to be achieved, without necessarily raising the temperature of the remaining portions of the substrate (e.g., the interior of the substrate and/or the second, opposing major surface of the substrate) to a point sufficient to cause unacceptable physical changes or damage. In the specific instance of bonding a fibrous web to a substrate, in some embodiments the temperature of the fluid-impinged surfaces of the fibrous web and of the substrate can be sufficiently raised to achieve the above-described surface-bonding, e.g. without causing the fibers to become embedded in the substrate, and/or without causing such melting, densification and/or solidification of the fibers immediately adjacent the substrate surface as to cause the formation of a continuous bond.

Those of ordinary skill in the art will recognize the herein-described bonding to be melt-bonding, i.e. in which molecules of the fiber surface material and of the substrate surface material intermix while in a heated state achieved by the heated fluid impingement and then remain intermixed upon cooling and solidification. Those of ordinary skill in the art will also appreciate that the heated fluid-impingement methods disclosed herein are not limited to the formation of surface-bonded laminates as described herein, and may be used for additional purposes, e.g. for achieving melt-bonding that does not fall within the definition of surface bonding as used herein, and even for purposes other than melt-bonding.

In some embodiments, the impinging of heated fluid onto a first major surface of a first moving substrate and the impinging of heated fluid onto a first major surface of a second moving substrate are performed simultaneously, with the impinging of heated fluid continuing substantially up until the time that the first major surfaces of the substrate are brought into contact with each other.

Figure 8:
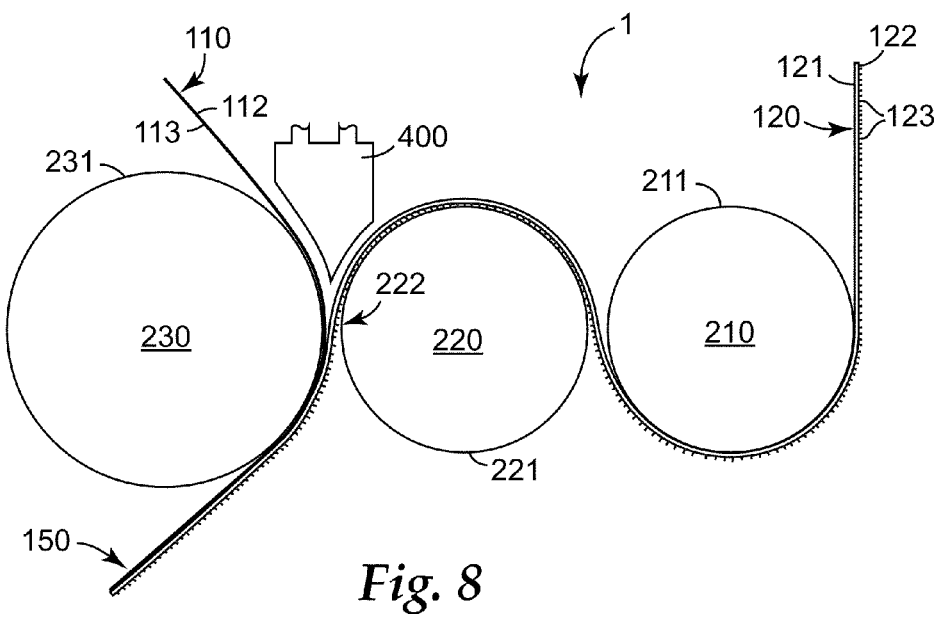
FIG. 8 is a side view of an exemplary apparatus and process that may be used to bond a first substrate to a second substrate.

Shown in FIG. 8 is an exemplary apparatus 1 that can be used at least to achieve the above-described surface bonding. In such embodiments, first substrate 110 (e.g., a fibrous web) and second substrate 120 (e.g., a substrate optionally containing protrusions) are each in contact with a respective backing surface during the impinging of heated fluid onto the first major surface of each substrate. Such a backing surface may serve to support the substrate, and may also be cooled to a certain amount (e.g. 100, 200, or 300 or more degrees C. below the temperature of the impinging heated fluid), so as to assist in keeping the rest of the substrate sufficiently cool to prevent or minimize damage, melting, etc., of the substrate, during the time that the first major surface of the substrate is heated so as to facilitate the surface bonding. If a substrate is discontinuous or porous (e.g., if the substrate is a fibrous web) such a backing surface may also serve to occlude the second major surface of the substrate such that the impinging fluid does not penetrate through the thickness of the substrate and exit through the second major surface. Thus in these embodiments, the heating of a major surface of a substrate by the impinging of heated fluid as described herein, does not encompass methods in which heated fluid is impinged upon a major surface of a substrate and passed through the substrate so as to exit through the oppositely-facing major surface.

The backing surface may in some embodiments be provided by a backing roll. Thus, in the exemplary illustration of FIG. 8, second major surface 113 of substrate 110 is in contact with surface 231 of backing roll 230 during the impinging of heated fluid onto first major surface 112 of substrate 110. Likewise, second major surface 122 of substrate 120 (or the outermost surface of protrusions 123, if such protrusions are present), is in contact with surface 221 of backing roll 220 during the impinging of heated fluid onto first major surface 121 of substrate 120.

In some embodiments, a preheat roll can be used to preheat a surface of one or both of substrates 110 and 120 prior to the impinging of the heated fluid. In the exemplary illustration of FIG. 8, major surface 121 of substrate 110 is brought into contact with surface 211 of preheat roll 210 prior to the impinging of heated fluid onto major surface 121 of substrate 110.

In the illustrated embodiment of FIG. 8, backing roll 220 and backing roll 230 combine to form lamination nip 222 in which first major surface 112 of substrate 110 and first major surface 121 of substrate 120 are brought into contact with each other while at a temperature (established by the heated fluid impingement) sufficient to cause at least surface-bonding of substrates 110 and 120 to each other. As mentioned previously herein, it may be advantageous to perform such bonding under conditions which minimize any damage, crushing and the like, to any component of substrates 110 and 120. This may be particularly useful in the event that, as shown in FIG. 8, substrate 120 comprises protrusions (e.g., that might be susceptible to being deformed or crushed). Thus, backing rolls 230 and 220 may be arranged so as to operate nip 222 at very low pressure in comparison to the pressures normally used in the lamination of materials (for which relatively high pressure is often preferred). In various embodiments, the bonding of substrates 110 and 120 together may be performed with a lamination nip pressure of less than about 15 pounds per linear inch (27 Newtons per linear cm), less than about 10 pli (18 Nlc), or less than about 5 pli (9 Nlc). In further embodiments, backing roll 230, backing roll 220, or both, may comprise at least a surface layer of a relatively soft material (e.g., a rubber material with a hardness of less than 70 on the Shore A scale). Such a relatively soft surface layer may be achieved e.g. by the use of a roll with a permanently attached soft surface coating, by the use of a removable sleeve of soft material, by covering the surface of the backing roll with relatively soft and resilient tape, and the like. If desired, the surface of one or both backing rolls may be stepped across the face of the roll so a to provide lamination pressure selectively in certain locations.

Upon exiting lamination nip 222, laminate 150 (which in some embodiments may be surface-bonded, loft-retaining bonded, or both) may be cooled if desired, e.g. by contacting one or both major surfaces of laminate 150 with a cooling roll, by the impinging of a cooling fluid upon one or both surfaces of laminate 150, and the like. Laminate 150 may thereafter be processed through any suitable web-handling process, rolled up, stored, etc. For example, additional layers may be coated or laminated on laminate 150, individual pieces may be cut therefrom as described previously, and so on.

As mentioned, bonding apparatus and methods described herein may be particularly advantageous for the bonding of substrates comprising easily crushed protrusions. In addition, bonding apparatus and methods described herein may be particularly suited for the bonding of porous materials such as fibrous webs. Such webs may comprise a self-insulating capacity such that the first major surface of the fibrous web may be heated by the impinging of heated fluid, while the remainder (interior and second major surface) of the web remain relatively cool. (Some adventitious additional fiber-fiber bonding may occur within the fibrous web during the heat exposure). Bonding processes as described herein may also be especially suitable for the bonding of fibrous webs to a substrate while retaining the loft of the fibrous web, as mentioned previously.

Those of ordinary skill in the art will appreciate that the heating of multiple substrates, e.g. converging substrates, by impinging heated fluid onto a first major surface of a first moving substrate and the impinging of heated fluid onto a first major surface of a second moving substrate (in particular as achieved by use of the nozzles described later herein), may be suitable for many uses, including uses other than the aforementioned bonding or surface-bonding. For example, such methods may be used to evaporate liquids from substrates, to modify the surface structure of substrates by annealing or the like, to promote a chemical reaction or surface modification, to dry, harden, and/or crosslink a coating present on the surface, and so on.

The impinging of heated fluid onto first major surface 112 of substrate 110, and the impinging of heated fluid onto first major surface 121 of substrate 120, may be achieved by the use of nozzle 400. A nozzle 400 of the exemplary type shown in FIG. 8 is shown in greater detail in FIG. 9. As shown in side view in FIG. 9 (viewed along an axis transverse to the direction of motion of substrates 110 and 120, i.e., an axis aligned with the long axes of backing rolls 220 and 230), nozzle 400 comprises at least a first fluid delivery outlet 420, through which heated fluid may be impinged onto first major surface 112 of substrate 110, and a second fluid delivery outlet 430 through which heated fluid may be impinged onto first major surface 121 of substrate 120. (References herein to first fluid delivery outlet, second fluid delivery outlet, etc. are used for convenience of differentiating separate outlets, etc. from each other, and should not be interpreted as requiring that the fluids delivered by the different outlets etc. must differ in composition). First fluid delivery outlet 420 is supplied with heated fluid by first fluid delivery channel 421 to which it is fluidly connected, and second fluid delivery outlet 430 is supplied with heated fluid by second fluid delivery channel 431 to which it is fluidly connected. In some embodiments, nozzle 400 may comprise a single interior plenum (chamber) supplied with heated fluid from an external source (not shown) by way of supply line 410, with heated fluid being directed to first and second fluid delivery outlets 420 and 430 from the single common plenum and with first and second fluid delivery outlets 420 and 430 thus comprising first and second portions of a single continuous fluid delivery outlet. Thus in such embodiments, first and second fluid delivery channels 421 and 431 are portions of a single common plenum rather than being physically separate channels, and first and second fluid delivery outlet portions 420 and 430 will deliver heated fluid from a common source at similar or identical conditions (in such case, outlet portions 420 and 430 may simply be differently-facing portions of a single outlet).

In alternative embodiments, the interior of nozzle 400 may be divided (e.g., by optional interior partition 422 of FIG. 9) into first fluid delivery channel 421 and second fluid delivery channel 431 that are physically separate and that are not fluidly connected with each other. In such case, second fluid delivery channel 431 and second fluid delivery outlet 430 may be supplied, by second fluid supply line 411, with a heated fluid that is different (e.g., that is air at a different temperature, pressure, velocity, etc.), from the heated fluid supplied to first fluid delivery channel 421 and first fluid delivery outlet 420.

Figure 9:
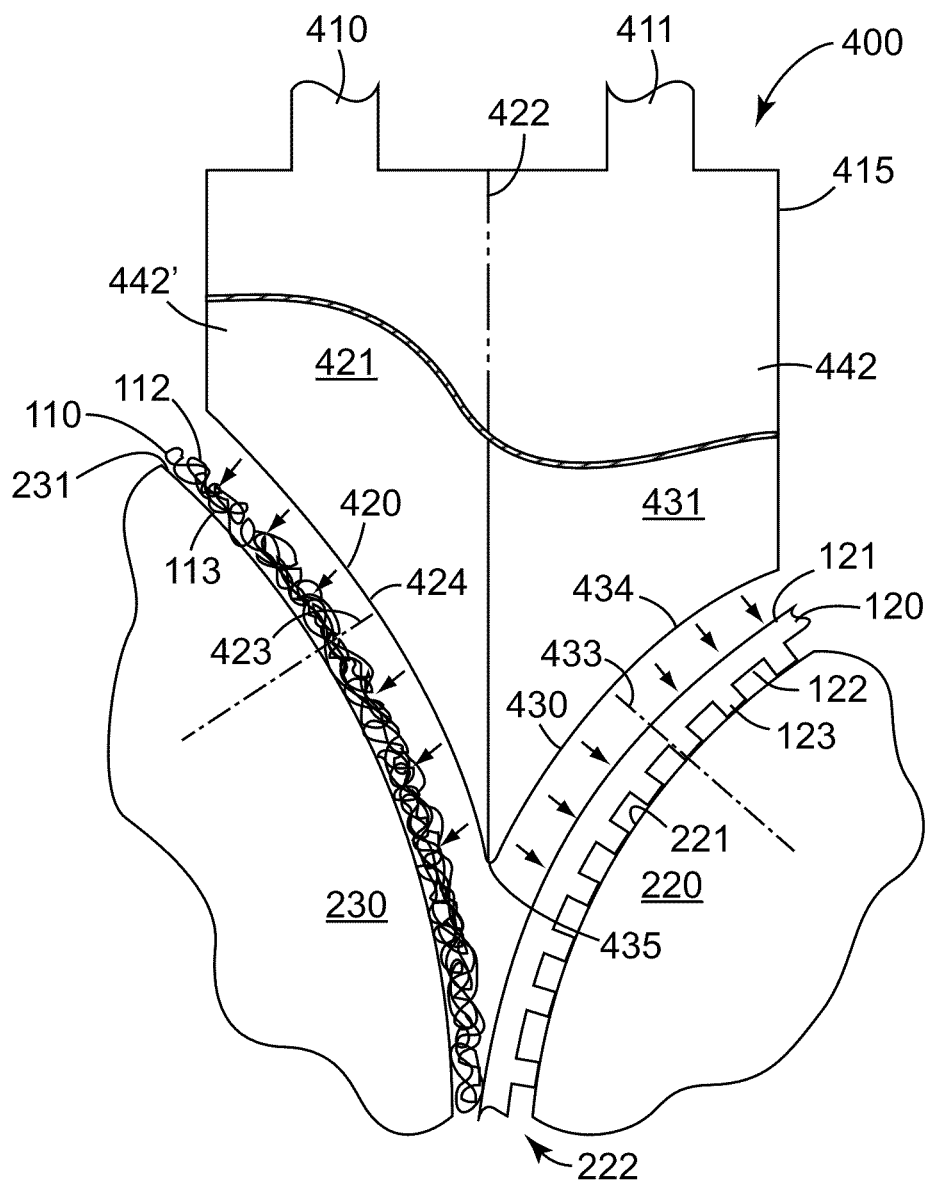
FIG. 9 is an expanded side view in partial cutaway of a portion of the exemplary apparatus and process of FIG. 8.

While the exemplary nozzle 400 of FIGS. 8 and 9 is shown as a single unit from which heated fluid may be impinged onto first major surface 112 of substrate 110 and onto first major surface 121 of substrate 120, it will be appreciated that the herein-discussed impinging may be performed e.g. by the use of two adjacent but physically separated units one of which impinges heated fluid through fluid delivery outlet 420 onto first major surface 112 of substrate 110 and the other of which impinges heated fluid through fluid delivery outlet 430 onto first major surface 121 of substrate 120. Thus, while the term "nozzle" is used herein for convenience of discussion, the apparatus (e.g., nozzle) described herein should be understood to encompass apparatus in which a single unit impinges fluid onto both substrates as well as a multiple-unit apparatus in which one unit impinges fluid onto one substrate and another unit (which may be a physically separate unit) impinges fluid onto the other substrate.

Typically, nozzle 400 will comprise solid (i.e., impermeable) partitions 442 and 442' that collectively define fluid delivery channels 421 and 431. The terminal ends of partitions 442 and 442' that are closest to substrate 110 may collectively define fluid delivery outlet 420 (and may be the only elements that define fluid delivery outlet 420 if outlet 420 does not comprise a fluid-permeable sheet (described later in detail) at its working face. Similarly, the terminal ends of partitions 442 and 442' that are closest to substrate 120 may collectively define fluid delivery outlet 430.

Figure 10A:
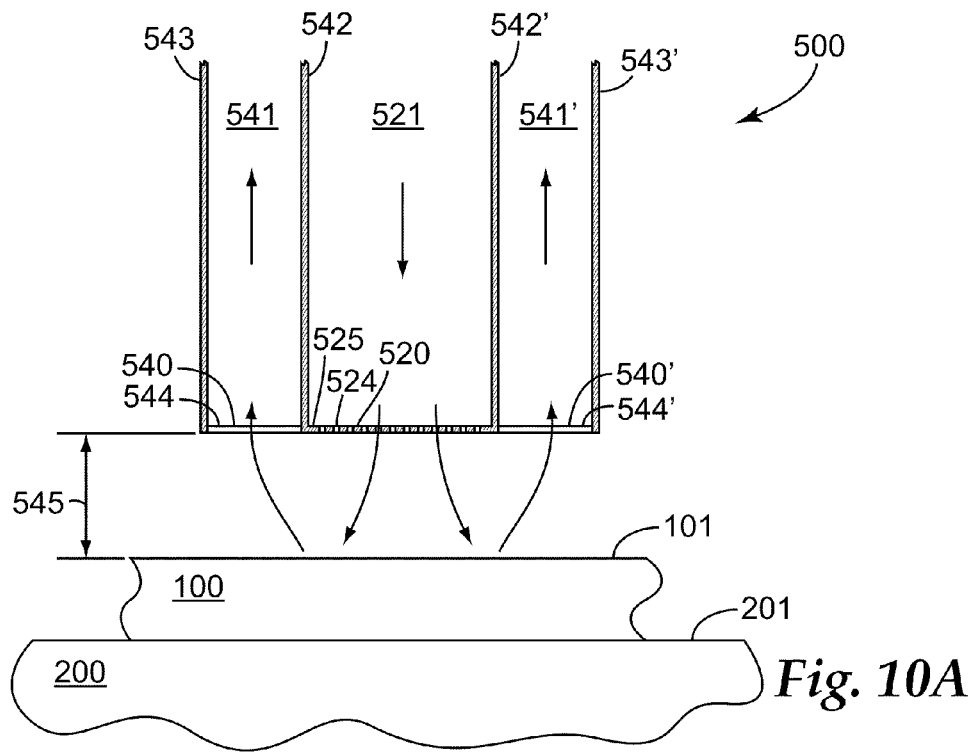
FIG. 10a is a cross sectional diagrammatic illustration of a portion of an exemplary apparatus and process that may be used to impinge heated fluid onto a substrate and to locally remove the impinged fluid.

Partitions 442 and 442' may be positioned generally parallel to each other (e.g., in similar manner as shown in FIG. 10a for partitions 542 and 542', which define fluid delivery channel 521 of nozzle 500 in similar manner that partitions 442 and 442' define fluid delivery channel 421 of nozzle 400), if it is desired that fluid delivery channels 421 and/or 431 have constant width. Or, the width between partitions 442 and 442' may vary if it is desired e.g. provide a fluid delivery channel that narrows or expands as the fluid progresses down the channel. In addition to partitions 442 and 442', nozzle 400 may comprise one or more partitions 415 that define the rear portion of nozzle 400 (away from the fluid delivery outlets). Thus, nozzle 400 may comprise at least partitions 442, 442', and 415, which collectively provide an enclosure into which heated fluid may be supplied by supply line 410 (and supply line 411, if present), with the primary, or only, pathways for the heated fluid to exit nozzle 400 being through fluid delivery outlets 420 and 430.

For convenience of description, first fluid delivery outlet 420 is characterized as comprising working face 424, which can be most conveniently considered to be the surface through which the heated fluid passes as it exits outlet 420. Working face 424 may be an imaginary surface, such as an imaginary arcuate surface (e.g., a section of a cylindrical surface) defined by terminal ends of partitions 442 and 442'. Or, working face 424 may comprise a physical layer, e.g. a fluid-permeable sheet, as discussed later herein in detail. Second fluid delivery outlet 430 is likewise characterized as comprising working face 434.

Each outlet and working face thereof may have a circumferential length, and a lateral width (extending in a direction transverse to the direction of motion of the adjacent substrate, i.e. extending in a direction aligned with the long axes of the adjacent backing roll). In some embodiments, the circumferential length may be longer than the lateral width, so that the outlet is circumferentially elongated. While in the exemplary illustration of FIG. 8, first fluid delivery outlet 420 extends over the entire circumferential length of the face of nozzle 400 that is adjacent to roll 230 (with second fluid delivery outlet 430 likewise extending over the entire circumferential length of the face of nozzle 400 that is adjacent to roll 220), in some embodiments each face of nozzle 400 can comprise multiple separate fluid delivery outlets. Such multiple outlets may be defined by laterally-oriented dividers and may be spaced over the circumferential length of a nozzle face, as shown in Example Set 3.

First fluid delivery outlet 420, and second fluid delivery outlet 430, are in diverging relation. The term diverging relation can be defined by way of axis 423 drawn normal to working face 424 of first fluid delivery outlet 420, and axis 433 drawn normal to working face 434 of second fluid delivery outlet 430, as depicted in FIG. 9. By diverging relation is meant that normal axis 423 of first fluid delivery outlet 420, and normal axis 433 of second fluid delivery outlet 430, when extended from their respective working faces in a direction away from nozzle 400, do not intersect regardless of how far they are extended. By diverging relation is additionally meant that normal axis 423 and normal axis 433 are oriented at least 25 degrees away from each other (by way of example, in FIG. 9, normal axis 423 and normal axis 433 are oriented approximately 90 degrees away from each other). In various embodiments, normal axes 423 and 433 are oriented at least about 40, at least about 60, or at least about 80 degrees away from each other. In further embodiments, normal axes 423 and 433 are oriented at most about 140, at most about 120, or at most about 100 degrees away from each other.

Those of ordinary skill in the art will realize that in embodiments with arcuate fluid delivery outlets (described below in more detail), the relative orientation of normal axes 423 and 433 may vary with the circumferential location along each outlet at which the normal axis is positioned. In such cases, the denoting that two fluid delivery outlets are in diverging relation means that at least the portions of the two outlets that are in closest proximity to each other (e.g., the portions of outlets 420 and 430 that are proximal to salient 435) are in diverging relation. In some cases, e.g. in which at least one of the fluid delivery outlets is circumferentially extended so as to form e.g. a nearly-semicylindrical shape, a portion of that fluid delivery outlet that is distal to the other fluid delivery outlet (e.g., distal to salient 435) may not be in diverging relation with any or all portions of the other fluid delivery outlet. Such a case is described later herein with reference to Examples 1-3. However, in such cases, as long as the above-described condition is met in which at least portions of the two outlets that are in closest proximity to each other are in diverging relation, the fluid delivery outlets are still considered to be in diverging relation as defined herein.

First and second fluid delivery outlets 420 and 430 arranged in diverging relation as disclosed herein may be particularly advantageous for the directing of heated fluid onto two converging substrates. In particular, such fluid delivery outlets in diverging relation allow nozzle 400 to be placed closely adjacent to a lamination nip established by backing rolls, e.g., in the manner depicted in FIGS. 8 and 9. Although discussed herein primarily in the context of bonding substrates together, it will be appreciated that the use of fluid delivery outlets arranged in diverging relation may find other uses in the heating of substrates for other purposes.

In the exemplary illustration of FIGS. 8 and 9, first fluid delivery outlet 420 is arcuate with working face 424 that is generally congruent with (that is, has a generally similar shape to and generally parallels) the adjacent surface of backing roll 230. This may be advantageous in allowing working face 424 of first fluid delivery outlet 420 to be placed in close proximity to backing roll 230. Thus, in various embodiments, in operation of nozzle 400, working face 424 of first fluid delivery outlet 420 may be less than about 10, 5 or 2 mm from first major surface 112 of substrate 110, at the point of closest approach. Likewise, in the exemplary illustration of FIGS. 8 and 9, second fluid delivery outlet 430 is arcuate with a working face 434 that is generally congruent with the adjacent surface of backing roll 220. This may be advantageous in allowing working face 434 of second fluid delivery outlet 430 to be placed in close proximity to backing roll 220. In various embodiments, in operation of nozzle 400, working face 434 of second fluid delivery outlet 430 may be less than about 10, 5 or 2 mm from first major surface 121 of substrate 120, at the point of closest approach.

In particular embodiments, first fluid delivery outlet 420 is arcuate with a working face 424 that is generally congruent with the adjacent surface of backing roll 230, and second fluid delivery outlet 430 is arcuate with a working face 434 that is generally congruent with the adjacent surface of backing roll 220. This may allow nozzle 400 to be positioned such that each working face of each fluid delivery outlet is very close to the first major surface of its respective substrates.

In embodiments in which outlets 420 and 430 are desired to be closely mated to the adjacent surface of (cylindrical) backing rolls, the working face of each outlet may comprise an arcuate shape that is a section of a generally cylindrical surface with a radius of curvature matching that of the surface of the backing roll to which the outlet is to be mated. In situations in which backing roll 220 and backing roll 230 are the same diameter, the two fluid delivery outlets thus may be symmetric with the same radius of curvature. However, if backing roll 220 and backing roll 230 differ in diameter, as in the embodiment shown in FIGS. 8 and 9, the curvature of first fluid delivery outlet 420 may differ from that of second fluid delivery outlet 430.

The circumferential length of each arcuate outlet may differ as desired. For example, in FIGS. 8 and 9, the circumferential length of outlet 420 is longer than that of outlet 430. Optionally, one or both outlets may comprise an adjustable shutter (not shown in any figure) that may be adjusted so as to change the circumferential length of the outlet. Such a shutter may be used to adjust the dwell time of a substrate in the impinging heated fluid, e.g. independently of the speed of movement of the substrate. In operation of apparatus 1, the position of the shutter, as well as other process variables such as fluid temperature, fluid flowrate, backing roll temperatures, etc., may be manipulated as desired, e.g. in view of the line speed, thickness and other properties of the particular substrates being processed.

Fluid delivery outlet 420 and fluid delivery outlet 430 may be chosen to have any suitable lateral width. As used herein, lateral means in the direction transverse to the direction of motion of a substrate to be heated and in a direction parallel to the long axis of the backing roll (i.e., the direction in and out of plane in FIGS. 8 and 9). In some embodiments, particularly those in which at least one of the substrates to be bonded is in the form of a narrow strip (e.g., as in the exemplary embodiment of FIG. 7), it may be desired that the lateral width of the fluid delivery outlet be relatively narrow (e.g., chosen in consideration of the width of the substrate to be bonded). In such case it may further be desired that the fluid delivery outlet be elongated (e.g., circumferentially elongated) in a direction substantially aligned with the long axis of, and the direction of motion of, the substrate to be bonded (keeping in mind that the long axis and the direction of motion of the substrate may be arcuate when the moving substrate is supported by a backing roll). For example, in FIG. 9, working face 424 of outlet 420 is circumferentially elongated along an axis that is substantially aligned with the long axis and direction of motion of substrate 110.

A circumferential end of first fluid delivery outlet 420, and a circumferential end of second fluid delivery outlet 430, may be positioned adjacent to each other so as to form protruding salient 435, as shown in exemplary manner in FIG. 9. The angle of approach of the two outlets to each other may be such that the salient 435 takes the form of a relatively sharp protrusion, with working face 424 of outlet 420, and working face 434 of outlet 430, being at an acute angle relative to each other at their point of closest approach or contact. Such a sharply protruding design may advantageously permit salient 435 to be positioned deep into the converging nip region between backing rolls 220 and 230 and may allow heated fluid to be impinged upon substrates substantially until the instant that the substrates contact each other. In various embodiments, at their point of closest approach working face 424 of outlet 420 and working face 434 of outlet 430 may be at an angle relative to each other of less than about 70, less than about 50, or less than about 30 degrees.

In some embodiments, the working surface of a fluid delivery outlet may not be congruent with the backing roll to which it is mated. For example, either or both of outlets 420 and 430 could be generally planar (flat) rather than arcuate as shown in FIGS. 8 and 9. While this may mean that the fluid delivery outlet may not be able to be positioned as close to the backing roll, and the distance from the working face to the backing roll may vary along the length of the fluid delivery outlet, this may still be acceptable in some cases.

As mentioned, the working face of a fluid delivery outlet may be open; or, it may comprise a fluid-permeable sheet through which the heated fluid may be passed. Such a fluid-permeable sheet may render the flow of heated fluid through the outlet more uniform, e.g. over the circumferential length of the outlet. Additionally, depending on the characteristics of the sheet, the sheet may redirect the fluid somewhat away from its original direction of flow through the fluid delivery channel. For example, with reference to FIG. 9, heated fluid from supply 410 may flow through fluid delivery channel 421 in a direction generally aligned with the long axis of partition 422, but in passing through a fluid-permeable sheet at working face 424 of fluid delivery outlet 420 the fluid may be at least somewhat directed to flow in a direction more closely aligned with normal axis 423 of the working face 424 (e.g., as shown by the multiple arrows denoting fluid flow in FIG. 9). Such a design may have advantages in causing the heated fluid to be impinged on substrate 110 in a direction closer to normal to the substrate, as opposed to impinging on substrate 110 in a more tangential orientation. Similar considerations apply with regard to the presence of a fluid-permeable sheet on working face 434 of outlet 430. Internal baffles (not shown in any figure) within fluid delivery channels 421 and/or 431 may also be used to direct the heated fluid in a desired direction.

In various embodiments, the fluid-permeable sheet may comprise through-openings that collectively provide the sheet with a percent open area of at least about 20, at least about 30, or at least about 40. In further embodiments, the fluid-permeable sheet may comprise a percent open area of at most about 90, at most about 80, or at most about 70. In specific embodiments, the fluid-permeable sheet may comprise a perforated screen with through-holes of a diameter of at least about 0.2 mm, at least about 0.4 mm, or at least about 0.6 mm. The fluid-permeable sheet may comprise e.g. a perforated screen with through-holes of a diameter of at most about 4 mm, at most about 2 mm, or at most about 1.4 mm. The through-holes may be in the form of elongated, e.g. laterally-elongated, slots, as described later in Example 1. The combination of percent open area and through-hole size may be chosen to enhance the uniform heating of the substrate. The screen may be comprised of any material with durability and temperature resistance sufficient for the uses outlined herein. Metal screen, e.g. steel, may be suitable.

The heated fluid may exit the working face of the fluid delivery outlet at any suitable linear velocity. The velocity may be affected and/or determined by the volumetric flowrate of heated fluid supplied to nozzle 400 by supply line 410 (and supply line 411, if present), by the size of the fluid delivery outlets, by the percent open area and/or diameter of the through-holes in a fluid-permeable sheet (if present) at the working face of the outlet, etc. As mentioned, in the case that partition 422 is present, during operation of apparatus 1 the linear velocity of heated fluid exiting nozzle 400 through outlet 430 can be controlled independently of that exiting through outlet 420. The linear velocity will generally be in the low subsonic range, e.g., less than Mach 0.5, typically less than Mach 0.2. Often, the linear velocity will be in the range of a few meters per second; e.g., less than 50, less than 25, or less than 15 meters per second. As such the heated fluid impingement apparatus and methods used herein can be distinguished from the use of e.g. hot air knives, which often rely on a linear velocity approaching or exceeding sonic velocity.

The area of working faces 424 and 434 of outlets 420 and 430, respectively, may be chosen so as to heat an area of desired size, and may be chosen in consideration of the characteristics of the substrates to be heated (e.g., their width, thickness, density, heat capacity, etc.). Often, outlets with working faces in the range of from about 5 to 50 square centimeters may be used. The volumetric flowrate of the heated fluid, and the temperature of the heated fluid, may be chosen as desired. For melt-bonding applications, the temperature of the heated fluid may be chosen to be at least equal to, or somewhat above, the softening point or melting point of a component of the substrates.

Any suitable heated gaseous fluid may be used, with ambient air being a convenient choice. However, dehumidified air, nitrogen, an inert gas, or a gas mixture chosen to have a specific effect (e.g. the promotion of bondability, hydrophobicity, etc.) may be used as desired. The fluid may be heated by an external heater (not shown in any figure) prior to being delivered to nozzle 400 through supply line 410 (and 411, if present). In addition, or instead, heating elements may be supplied within nozzle 400; or additional heating (e.g., resistance heating, infrared heating, etc.) of nozzle 400 may be applied.

While heating of substrates and/or bonding of substrates as described herein may be performed without any special handling of the fluid after it has been impinged on the substrates (as evidenced by Example Set 3), in certain embodiments it may be advantageous to provide for local removal of the impinged fluid. By local removal is meant that fluid that has been impinged on the surface of a substrate by a nozzle is actively removed from the local vicinity of the fluid impingement nozzle. This is to be contrasted with processes in which the impinged fluid is passively allowed to escape from the local vicinity of the nozzle, either to dissipate into the surrounding atmosphere or to be removed by a device (e.g., a hood, shroud, duct, etc.) that is positioned some distance (e.g., at least a decimeter) away from the fluid impingement nozzle. Such local removal can be achieved by the use of a nozzle of the general type described earlier herein, comprising a fluid delivery channel with a fluid delivery outlet, with the addition of at least one fluid capture inlet that is locally positioned relative to the fluid delivery outlet. By locally positioned it is meant that at their point of closest approach to each other, the fluid capture inlet is located less than 10 mm from the fluid delivery outlet. In various embodiments, at their point of closest approach, the fluid capture inlet is located less than about 5 mm, or less than about 2 mm, from the fluid delivery outlet. The fluid capture inlet is fluidly connected to a fluid removal channel, through which fluid that has been captured by the fluid capture inlet can be actively removed (e.g., by way of an exhaust line fluidly connected to an external suction blower, not shown in any figure). The fluid capture inlet can locally remove a substantial volume percent of the impinged fluid from the local vicinity of the nozzle before the impinged fluid is able to exit the local vicinity of the substrate and irreversibly disperse into the surrounding atmosphere so as to no longer be locally removable. In various embodiments, at least about 60%, at least about 80%, or substantially all, of the volumetric flow of the impinged fluid is locally removed by the apparatus and methods disclosed herein.

Nozzle 500 with a locally positioned fluid capture inlet is shown in representative manner in FIG. 10a, which is a partial cross sectional view along the machine direction of substrate 100 as it passes adjacent to nozzle 500 (with the direction of movement of substrate 100 being out of plane). For simplicity of description, FIG. 10a only shows a single fluid delivery channel 521, single fluid delivery outlet 520, and single substrate 100 (in contact with backing surface 201, e.g. of backing roll 200), but it should be understood that when used to impinge heated fluid onto two converging substrates in similar manner as described for nozzle 400, nozzle 500 will comprise two fluid delivery channels, two fluid delivery outlets, etc., as will be discussed in further detail with respect to FIG. 11.

While in the exemplary embodiment of FIG. 10a, fluid delivery outlet 520 and fluid delivery channel 521 thereof, and fluid capture inlets 540/540' and fluid removal channels 541/541' thereof, are shown as one unit, with common partitions 542 and 542' therebetween, it should be understood that the herein-discussed impinging and removal of fluids may be performed by the use of two or more adjacent but physically separated units, at least one of which impinges heated fluid through fluid delivery outlet 520 and at least another of which locally captures the impinged fluid through fluid capture inlet 540 or 540'. Thus, while the term "nozzle" is used herein for convenience of discussion, the apparatus (e.g., nozzle) described herein should be understood to encompass apparatus in which a single unit both impinges fluid and captures the impinged fluid, as well as multiple-unit apparatus in which one or more units impinge fluid and one or more additional units (which may be physically separate units) capture the impinged fluid.

In similar manner to nozzle 400, nozzle 500 comprises fluid delivery outlet 520 comprising working face 524 (which in this case comprises perforated screen 525), with fluid delivery outlet 520 being fluidly connected to fluid delivery channel 521 (of which only the portion proximate to fluid delivery outlet 520 is shown in FIG. 10a). Additionally, nozzle 500 comprises fluid capture inlets 540 and 540', each of which is locally positioned relative to fluid delivery outlet 520. Fluid capture inlets 540 and 540' are fluidly connected to fluid removal channels 541 and 541', respectively. In the exemplary configuration shown, fluid capture inlets 540 and 540' laterally flank (that is, they are located on either side of, in a direction transverse to the direction of motion of substrate 100, e.g. in a direction along the long axis of backing roll 200) fluid delivery outlet 520. Similarly, fluid removal channels 541 and 541' laterally flank fluid delivery channel 521, being separated therefrom only by (solid) partitions 542 and 542', respectively. Fluid removal channel 541 is thus defined on one lateral side by partition 542, and on the other lateral side by partition 543 (which in this embodiment comprises the external housing of nozzle 500 in this area). Fluid removal channel 541' is likewise defined by partitions 542' and 543'.

Referring again to the simplified one delivery outlet, one-substrate illustration of FIG. 10a, when active suction is applied to fluid removal channels 541 and 541' (e.g., by an external suction fan or blower), a substantial volume percent of the heated fluid that exits working face 524 of fluid delivery outlet 520 and is impinged upon first major surface 101 of substrate 100, may be locally captured by fluid capture inlets 540 and 540' and removed by way of fluid removal channels 541 and 541'. It has been found that such local capture of impinged fluid may alter the flow patterns of the fluid after, during, or possibly even before it impinges on surface 101 of substrate 100. For example, such local capture may modify, reduce or substantially eliminate fluid flow stagnation phenomena in which the fluid impinges onto the substrate in such manner as to drastically slow or even stop the flow of the fluid in certain locations. In altering the flow patterns, the local capture may advantageously modify (e.g., increase) the heat transfer coefficient between the impinging fluid and the substrate in certain locations and/or it may provide a more uniform transfer of heat across a wider area of the substrate. As evidenced by Examples 1-2, local capture of impinged fluid may furthermore allow heated fluid of lower, e.g. considerably lower, temperature to be used while still heating the substrates sufficiently to allow bonding, in comparison to the impinging fluid temperature needed in the absence of such local capture. Such local capture may also allow faster line speed of substrates to be used.

Working faces 544 and 544' of fluid capture inlets 540 may be positioned approximately even with working face 524 of fluid delivery outlet 520, so that working faces 544, 544' and 524 are generally equidistant from surface 101 of substrate 100, as represented by distance 545 in FIG. 10a (in the design of FIG. 10a, working faces 544 and 544' of fluid capture inlets 540 and 540' comprise imaginary surfaces rather than fluid-permeable screens). Nozzle 500 may be positioned such that working face 524 of fluid delivery outlet 520, and working faces 544 and 544' of fluid capture inlets 540, are positioned within about 10, about 5, or about 2 mm, of first major surface 101 of substrate 100. Terminal ends (closest to substrate 110) of partitions 542 and 543 may be generally equidistant from substrate 100, as shown in FIG. 10a. Or, the terminal end of outwardly-flanking partition 543 may be extended closer to substrate 110, which may enhance the capturing of impinged fluid by fluid capture inlet 540 (similar considerations apply for fluid capture inlet 540').

Figure 10B:
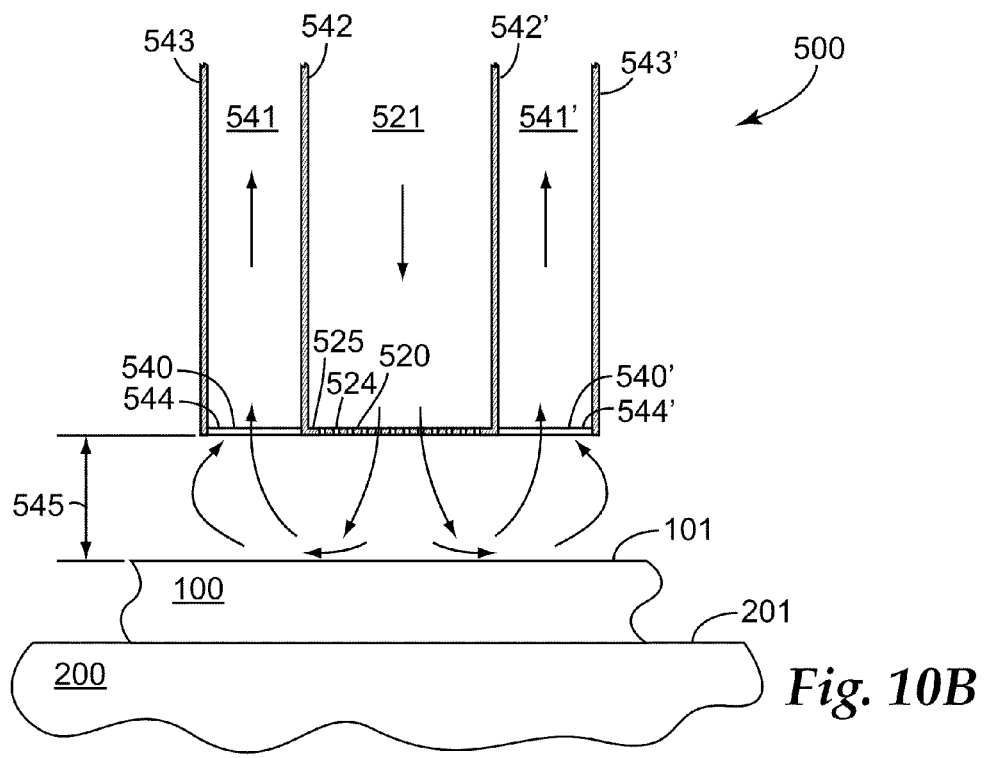
FIGS. 10b and 10c depict additional ways in which the exemplary apparatus and process of FIG. 10a may be operated.
Figure 10C:
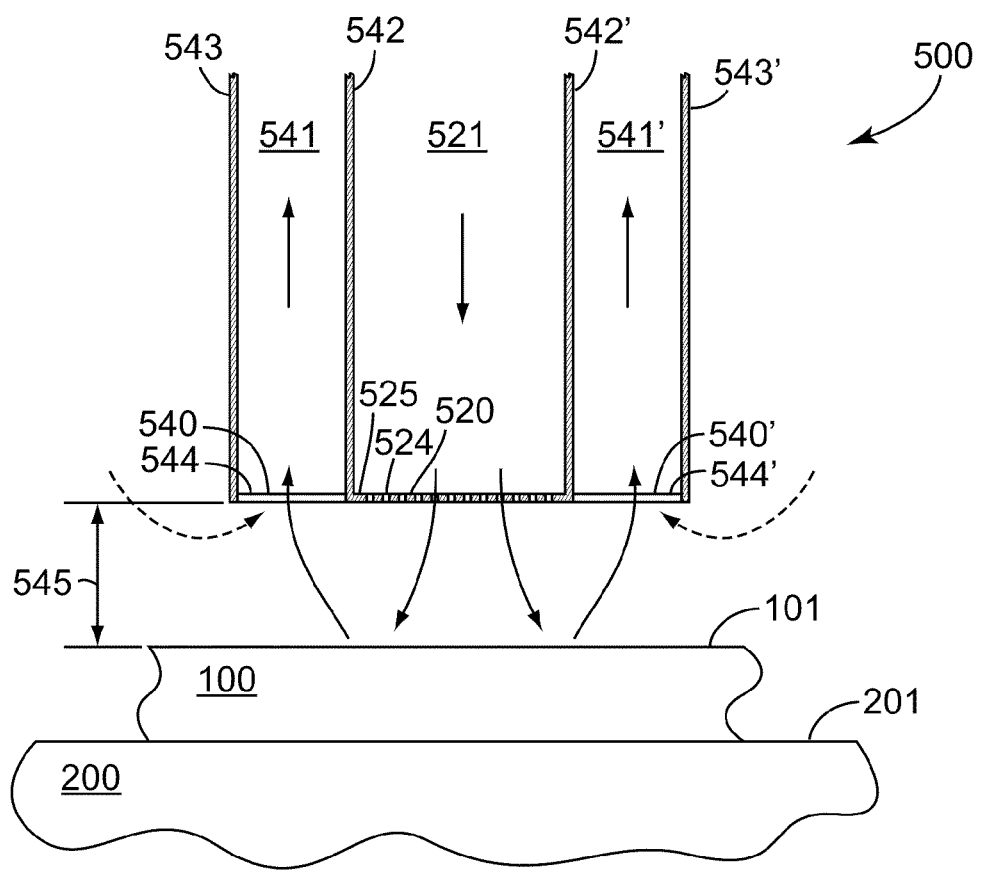

FIGS. 10a, 10b and 10c illustrate embodiments in which working faces 544 and 544' of fluid capture inlets 540 and 540' are open and do not comprise a perforated screen or any other type of fluid-permeable sheet. In such instances, the working face of a fluid capture inlet may be defined primarily by the terminal ends of partitions. For example, working face 544 may be defined at least in part with by terminal ends of partitions 543 and 542, e.g. in combination with terminal ends of laterally extending partitions not shown in FIG. 10, such as housing 415 shown in FIG. 9) However, in various embodiments, a fluid-permeable sheet may be provided at the working face of one or more fluid capture inlets. Such a fluid-permeable sheet may comprise similar properties (e.g., of percent open area etc.) as that of a fluid-permeable sheet provided at the working face of the fluid delivery inlet to which the fluid capture outlet is locally positioned, and may be a continuation of the fluid-permeable sheet of the fluid delivery inlet (e.g., as in Example 1). In other embodiments, the fluid-permeable sheet of the fluid capture inlet may comprise different properties, and/or be comprised of different materials, than the fluid-permeable sheet of the fluid delivery inlet.

FIG. 10a illustrates an embodiment in which the configuration of nozzle 500, the distance from nozzle 500 to substrate 100, the velocity of impinging fluid used, etc., combine to provide that substantially all of the fluid that exits outlet 520 and impinges on substrate 100 is captured by inlets 540 and 540' before the impinged fluid is able to penetrate laterally beyond the boundaries of inlets 540 and 540' to any significant extent. This phenomenon is represented by the arrows denoting direction of fluid flow in FIG. 10a. (Of course, some small portion of the fluid that exits outlet 520 may be removed by inlets 540 or 540' before impinging onto substrate 100). FIG. 10b illustrates an embodiment in which nozzle 500 is operated such that some portion of the impinged fluid is able to penetrate laterally beyond the boundaries of inlets 540 and 540' (and hence may locally mix with ambient air to at least a small extent) but in which the suction provided by capture inlets 540 and 540' is sufficiently strong that substantially all of the impinged fluid is still captured by capture inlets 540 and 540'. FIG. 10c illustrates an embodiment in which nozzle 500 is operated such that substantially all of the impinged fluid is captured by capture inlets 540 and 540', and in which some portion of the ambient air is also captured by the capture inlets (flow of ambient air in FIG. 10c is indicated by the dashed arrows). When nozzle 500 is operated in this manner, in various embodiments the volumetric flow rate of captured ambient air can range up to about 10%, up to about 20%, or up to about 40%, of the volumetric flow rate of captured impinged fluid.

Those of ordinary skill in the art will appreciate that by the methods disclosed herein, impinged fluid may be circulated at least slightly laterally beyond the boundaries of the fluid capture inlets and yet still locally captured by the fluid capture inlets and removed. It has been found that adjustment of the design of nozzle 500 and of the operating parameters of the system (e.g., flowrate of heated fluid, suction applied through the fluid removal channels, etc.) can alter the extent to which the impinged heated fluid is able to penetrate laterally beyond the boundaries of the fluid capture inlets before being captured by the capture inlets, and/or can alter the extent to which ambient air is captured in addition to the impinged fluid, either of both of which can advantageously enhance the uniformity of the heating experienced by substrate 100.

In reviewing FIGS. 10a, 10b, and 10c, those of ordinary skill in the art may realize that in these exemplary illustrations, fluid delivery outlet 520 is only bordered by fluid capture inlets 540 and 540' laterally, there being no provision for fluid capture inlets surrounding fluid delivery outlet 520 in the direction of motion of substrate 100 so as to completely surround the perimeter of fluid delivery outlet 520. However, in similar manner as discussed with respect to nozzle 400, and as discussed later with respect to FIG. 11, the inlets and outlets of nozzle 500 may comprise circumferentially elongated arcuate shapes with the elongated axis of the inlets and outlets aligned in the direction of motion of substrate 100. Thus, in various embodiments, the providing of fluid capture inlets 540 and 540' that laterally flank fluid delivery outlet 520 may be sufficient to surround at least about 70%, at least about 80%, or at least about 90%, of the perimeter of fluid delivery outlet 520 with fluid capture inlets. (Those of skill in the art will also appreciate that in using nozzle 500 to bond two substrates as described in further detail in reference to FIG. 11, two fluid delivery outlets, each laterally flanked by fluid capture inlets, may be positioned with their circumferential terminal ends in close proximity, which, for the combined outlets, will further minimize the outlet area that is not bordered by a fluid capture inlet).

While FIGS. 10a, 10b, and 10c only show a single fluid capture inlet and a single substrate for convenience of describing the basic premise of local fluid capture, it will be understood that nozzle 500 may be used to impinge heated fluid on two converging substrates and to locally remove the impinged fluid from the local vicinity of the nozzle. Such an embodiment is depicted in exemplary manner in FIG. 11. In the illustrated embodiment, nozzle 500 comprises first fluid delivery outlet 520 with working face 524, outlet 520 being fluidly connected to first fluid delivery channel 521, and being laterally flanked by first fluid capture inlets 540 and 540' which are fluidly connected to first fluid removal channels 541 and 541' (all as described with respect to FIG. 10a).

Nozzle 500 additionally comprises second fluid delivery outlet 550 with working face 554, outlet 550 being fluidly connected to second fluid delivery channel 551, and being laterally flanked by second fluid capture inlets 560 and 560' with working faces 564 and 564' respectively and which are fluidly connected to second fluid removal channels 561 and 561' respectively. All of these features are analogous to nozzle 400 of FIG. 9, with the addition of the fluid capture inlets and the fluid removal channels. As such, fluid delivery channels 521 and 551 may be regarded as substantially equivalent to fluid delivery channels 421 and 431 of nozzle 400, and fluid delivery outlets 520 and 550 can be regarded as substantially equivalent to fluid delivery outlets 420 and 430 of nozzle 400. Thus, it will be understood that relevant descriptions of features of nozzle 400, for example the circumferentially elongated and/or arcuate nature of the outlets, their positioning near the substrate, the arranging of the outlets to form a protruding salient 535, etc., apply in like manner to the features of nozzle 500. In particular, fluid delivery outlets 520 and 550 of nozzle 500 are in diverging relation in the manner previously described. In particular embodiments, fluid capture inlets 540 and 540' may be congruent with fluid delivery outlet 520, all of which may be congruent with adjacent surface 201 of backing roll 200 (that is, the arcuate shape of all of these elements may be similar and generally parallel to each other). Similar considerations apply for fluid capture inlets 560 and 560', and fluid delivery outlet 550, with respect to each other and to surface 206 of backing roll 205.

Figure 11:
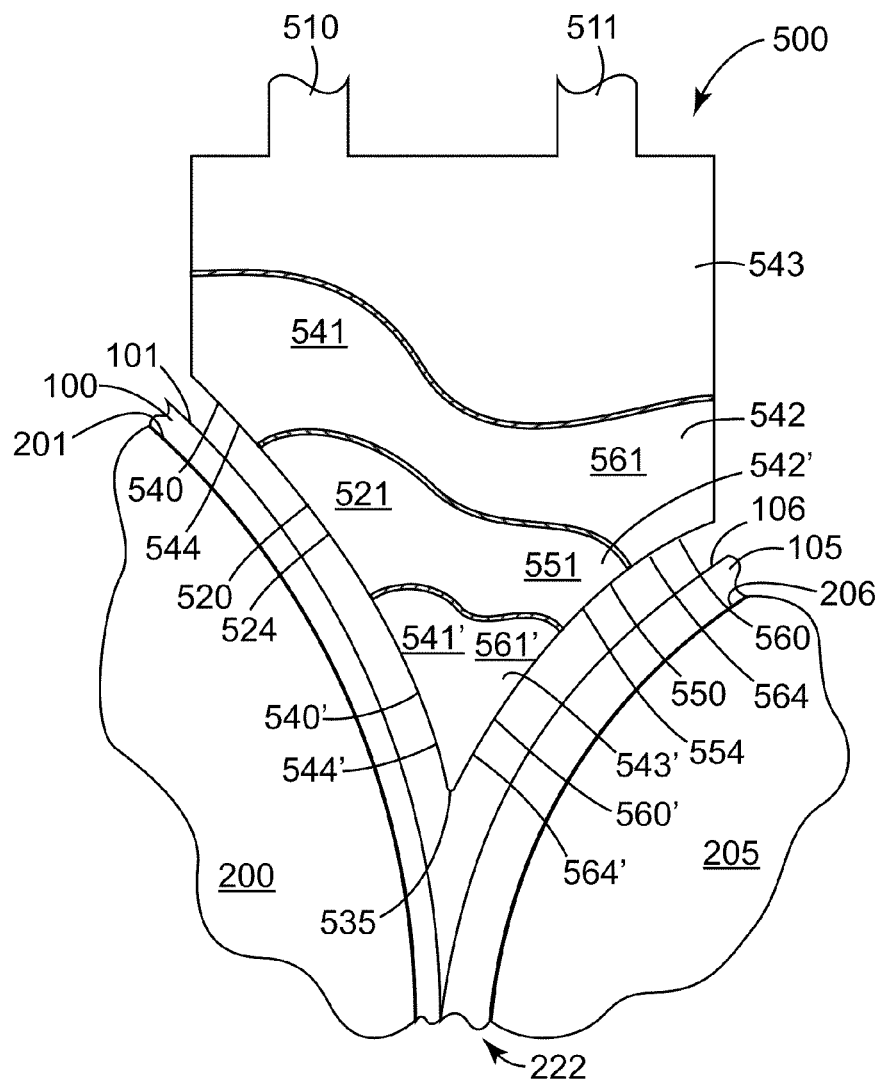
FIG. 11 is a side view in partial cutaway of an exemplary apparatus and process that may be used impinge heated fluid onto two substrates and to locally remove the impinged fluid, and to bond the two substrates together.

In FIG. 11, only one heated fluid supply line (510) is shown, and fluid delivery channels 521 and 551 are shown as comprising portions of a single plenum with no partition (analogous to partition 422 of nozzle 400) therebetween. It will be understood that such a partition could be used if desired, and a heated fluid supply line could be used for fluid delivery channel 551 that is separate from the heated fluid supply line used for fluid delivery channel 521 (in like manner to that described for nozzle 400).

At least one fluid exhaust line 511 is used to remove the captured fluid from the fluid removal channels of nozzle 500. In the illustrated embodiment fluid removal channels 541 and 561 comprise portions of a single fluid removal channel, there being no dividing partition in between. Thus in this embodiment a single fluid exhaust line may be used to remove captured fluid from channels 541 and 561. If a partition is provided between fluid removal channels 541 and 561, separate fluid exhaust lines can be provided for each fluid removal channel. Similar considerations apply to channels 541' and 561'.

If desired, separate fluid exhaust lines can be connected to fluid removal channels 541 and 541'. Alternatively, passages can be provided within nozzle 500 (e.g., passing laterally through fluid delivery channel 521), that interconnect fluid removal channels 541 and 541', so that a single fluid exhaust line can be used for both. Similar considerations apply to channels 561 and 561'.

Fluid delivery outlet 520 may be used to impinge heated fluid onto major surface 101 of substrate 100, while substrate 100 is in contact with backing surface 201 (e.g., of backing roll 200). Likewise, fluid delivery outlet 550 may be used to impinge heated fluid onto major surface 106 of substrate 105, while substrate 105 is in contact with backing surface 206 (e.g., of backing roll 205). These operations may be conducted in similar manner as described for nozzle 400, except that fluid capture inlets 540, 540', and 560 and 560' are used as described above, to locally capture the impinged fluid.

Figure 12:
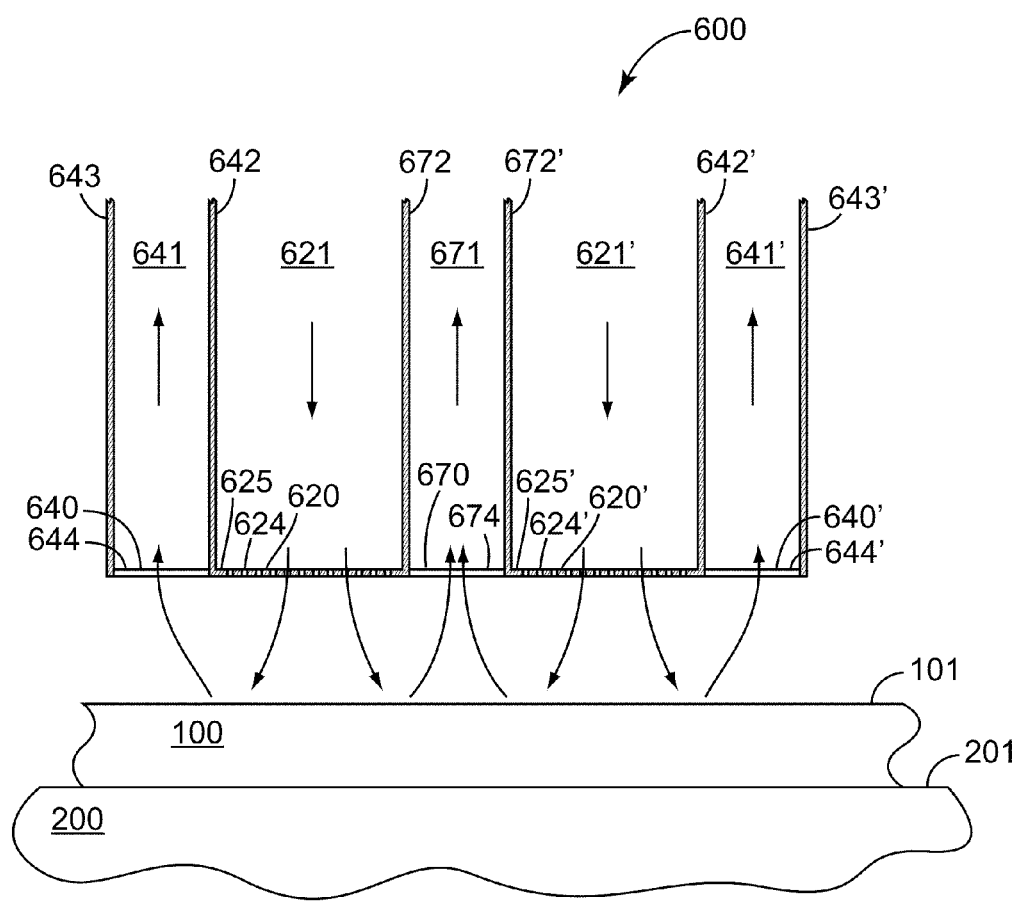
FIG. 12 is a cross sectional diagrammatic illustration of a portion of another exemplary apparatus and process that may be used to impinge heated fluid onto a substrate and to locally remove the impinged fluid.

In some cases it may be desirable to provide multiple, laterally spaced fluid delivery outlets each fluidly connected to a fluid delivery channel. As elsewhere herein, laterally signifies a direction transverse to the direction of motion of the substrate to be heated, e.g. along the long axis of a backing roll. FIG. 12 shows such an exemplary configuration, again in the simplified context of a single substrate 100 with the direction of substrate motion being out of plane of FIG. 12. Exemplary nozzle 600 comprises first and second laterally spaced fluid delivery outlets 620 and 620' with working faces 624 and 624', respectively, and fluidly connected to fluid delivery channels 621 and 621', respectively. In the illustrated embodiment, working faces 624 and 624' comprise perforated screens 625 and 625', respectively. Outer fluid removal outlets 640 and 640' are provided that laterally outwardly flank fluid delivery outlets 620 and 620'. Also provided is additional, inner fluid capture inlet 670 that is laterally sandwiched in between fluid delivery outlets 620 and 620'. Fluid capture inlets 640, 640', and 670 comprise working faces 644, 644', and 674, respectively, and are fluidly connected to fluid removal channels 641, 641' and 671 respectively. Outer fluid removal channels 641 and 641' are separated from fluid delivery channels 621 and 621' by partitions 642 and 642', respectively. Outer fluid removal channels 641 and 641' are further defined by partitions 643 and 643', respectively, which may comprise part of the housing of nozzle 600 in these locations. Inner fluid removal channel 671 is separated from fluid delivery channels 621 and 621' by partitions 672 and 672', respectively.

The descriptions of the various fluid delivery and removal channels, fluid delivery outlets and fluid capture inlets provided earlier herein with regard to nozzles 400 and 500, are applicable to the various channels, outlets and inlets of nozzle 600. And, of course, while shown (for convenience of description) in FIG. 12 in respect to a single substrate 100, it should be understood that when used to impinge heated fluid onto two converging substrates in similar manner as described for nozzle 400 and nozzle 500, nozzle 600 will comprise channels, outlets, inlets, etc., as needed to impinge heated fluid upon the two substrates. In particular, nozzle 600 may comprise two laterally spaced pairs of fluid delivery outlets with each outlet of a given pair being in diverging relation, and with the laterally spaced pairs of fluid delivery outlets being laterally outwardly flanked by pairs of fluid capture inlets and having an additional pair of fluid capture inlets laterally sandwiched therebetween.

As illustrated in FIG. 12, heated fluid exiting working faces 624 and 624' of fluid delivery outlets 620 and 620' and impinging on substrate 100 is locally captured by fluid capture inlets 640, 640' and 670. Those of ordinary skill in the art will appreciate that the interposition of inner fluid capture inlet 670 laterally in between fluid delivery outlets 620 may reduce or eliminate any stagnation points that otherwise may result from the colliding of fluid from the two outlets. Designs of the type depicted in FIG. 12 may provide enhanced uniformity in the heating of wide-width substrates. Additionally, designs of this type may be advantageous in the case in which it is desired to heat two substrates in parallel strips (e.g., to make laminates of the type shown in FIG. 7). In such case fluid delivery outlet 620 may be centered generally over one substrate strip, and fluid delivery outlet 620' may be centered over the other.

The basic design of nozzle 600, in which multiple, laterally spaced fluid delivery outlets are used, in which fluid capture inlets are positioned outwardly laterally flanking the fluid delivery outlets, and in which an additional fluid capture inlet is positioned laterally in between the fluid delivery outlets, can be extended as desired. That is, a nozzle may be produced with any number of fluid delivery outlets (with their long axis aligned generally in the direction of motion of the web), laterally interspersed in an alternating manner with fluid capture inlets. As mentioned previously, multiple, physically separate fluid delivery outlets and fluid capture inlets can be provided, to a similar end. Any such design may allow wide-width substrates to be heated by the methods disclosed herein.

Those of ordinary skill in the art will appreciate that while the apparatus and methods for local removal of impinged fluid may be particularly advantageous for applications such as heating of substrates to achieve surface-bonding as described herein, many other uses are possible.

EXAMPLES

Example 1

A spunbond nonwoven web available from First Quality Nonwovens under the trade designation Spunbond 50 gsm (SSS) was obtained. The web was 50 gsm with a dot pattern of 15% point bond and a width of 100 mm, and was comprised of polypropylene. A substrate was obtained from 3M Company, St. Paul, Minn. under the trade designation CS600 (of the general type described in U.S. Pat. No. 6,000,106). The first surface of the substrate was generally smooth and the second surface of the substrate bore protrusions at a density of approximately 2300 per square inch, (with the protrusions being male fastening elements each with an enlarged, generally disc-shaped head). The thickness of the substrate was approximately 100 microns (not counting the height of the protrusions) and the height of the protrusions was approximately 380 microns. The backing and protrusions were of integral construction and were both comprised of polypropylene/polyethylene copolymer. The substrate was obtained as elongated strips each of 24 mm width.

A web handling apparatus with lamination nip was setup in similar manner to that that shown in FIG. 8. Two elongated strip substrates were bonded to the first surface of a single nonwoven web as described herein. While for convenience the following description will occasionally be phrased in terms of one substrate, it will be understood that two identical substrates were identically handled, traveling in parallel.

In using the apparatus, the substrate was guided onto an 10.2 cm radius chrome preheat roll (analogous to roll 210 of FIG. 8) with the first surface of the substrate (that is, the surface opposite the surface bearing the protrusions) contacting the surface of the preheat roll. The preheat roll was internally heated by hot oil to comprise a nominal surface temperature of approximately 118 degrees C. Upon attainment of steady state operating conditions, the first surface of the substrate was found to attain a temperature of approximately 113 degrees C. (as monitored by a non-contact thermal measurement device).

From the preheat roll the substrate traversed a distance of approximately 5.1 cm to a first backing roll (analogous to roll 220 of FIG. 8) of 3.2 cm radius, which was not actively cooled or heated. On its surface the roll comprised a nominal 0.64 cm thick surface layer of silicone rubber impregnated with aluminum particles. The surface layer comprised a Shore A hardness of 60. The surface layer comprised two elevated plateaus that circumferentially extended completely around the roll (the plateaus were elevated approximately 2.2 mm above the surrounding surface of the roll), each of lateral width approximately 27 mm, with the lateral distance (across the face of the roll, in a direction aligned with the long axis of the roll) between their near edges of approximately 8 mm. The parallel-traveling substrates were guided onto the plateaus of the first backing roll so that the mushroom-shaped heads of the protrusions on the second surface of the substrate contacted the plateau surface. (The substrates were elevated on plateaus to minimize the chances of the nonwoven web contacting the surface the first backing roll.) After thus contacting the surface of the first backing roll, the substrates circumferentially traversed an arc of approximately 180 degrees around the first backing roll to be heated and bonded as described herein.

In using the apparatus, the nonwoven web was guided onto a second backing roll, of 10.2 cm radius (analogous to roll 230 of FIG. 8). The second backing roll comprised a metal surface and was controlled by internal circulation of fluid to a nominal temperature of 38 degrees C. The nonwoven web circumferentially traversed an arc of approximately 90 degrees around the second backing roll to be heated and bonded as described herein. The path of the nonwoven web was aligned with the paths of the two substrate strips so that when the two substrates contacted the nonwoven web in the nip between the two backing rolls, the substrate strips were aligned downweb with the nonwoven web.

The backing rolls were positioned in a horizontal stack, similar to the arrangement shown in FIG. 8. A heated-air impingement nozzle capable of local capture/removal of impinged air, was built and was placed vertically above the backing roll stack, adjacent the nip, in analogous manner to the placement of nozzle 400 in FIG. 8. As viewed from the side along an axis transverse to the web movement (i.e., as viewed in FIG. 8), the nozzle comprised a first surface and a second surface, with the first and second surfaces being in diverging relation (as defined earlier herein). Each surface comprised a generally cylindrical section, with the curvature of the first surface generally matching the curvature of the first backing roll (with the radius of curvature of the first surface being approximately 3.2 cm) and the curvature of the second surface generally matching the curvature of the second backing roll (with the radius of curvature of the second surface being approximately 10.2 cm). The circumferential length of the first surface was approximately 75 mm and the circumferential length of the second surface was approximately 50 mm. The two surfaces met at a protruding salient analogous to salient 435 of FIG. 9.

As viewed from a direction aligned with the movement of the two substrate strips, the first diverging surface of the nozzle comprised two air delivery outlets, each of lateral width approximately 25 mm. The two air delivery outlets were laterally outwardly flanked by two air capture inlets, each of lateral width approximately 21 mm. Sandwiched laterally in between the two air delivery outlets was an additional air capture inlet, of lateral width approximately 4 mm. A perforated metal screen comprising elongated slot openings was positioned so as to extend transversely along the first diverging surface so as to cover the two air-delivery outlets and the air capture inlet therebetween, but not covering the two outwardly laterally flanking air capture inlets. The slot openings were elongated in the lateral direction, were approximately 0.9 mm in width, and were circumferentially spaced at a center-to-center spacing of approximately 3.0 mm. The perforated metal screen comprised a percent open area of approximately 28%. Thus, the first surface of the nozzle comprised a configuration analogous to that shown in FIG. 12, except that the perforated metal screen defined the sandwiched air-capture inlet in addition to defining the working surfaces of the air delivery outlets.

When viewed from a direction aligned with the movement of the nonwoven web, the second diverging surface of the nozzle comprised a similar arrangement of two air delivery outlets, two laterally flanking air capture inlets, and one laterally sandwiched air capture inlet. The lateral widths of the outlets and inlets were the same as for the first diverging surface. The second diverging surface comprised an adjustable shutter that laterally extended so as to laterally cover the width of both air delivery outlets and that could be moved circumferentially along the second surface so as to control the circumferential length of the air delivery outlets. The shutter was positioned so that the circumferential length of the air delivery outlets of the second diverging surface was approximately 40 mm. The above-described perforated metal screen covered the two air-delivery outlets and the air capture inlet therebetween of the second diverging surface, in similar manner as for the first diverging surface.

All of the air delivery outlets and inlets of the first and second diverging surfaces were fluidly connected to air delivery channels and air removal channels, respectively. The air delivery outlets were all fed by the same air delivery conduit attached to the nozzle, so that the substrates, and the nonwoven web, received air at generally similar temperatures. The temperature and volumetric flowrate of the heated air supplied to the nozzle could be controlled as desired (by use of a heater available from Leister, of Kaegiswil, Switzerland, under the trade designation Lufterhitzer 5000). The volumetric rate of removal of captured air (through a removal conduit attached to the nozzle) could be controlled as desired.

The nozzle was positioned close to the first and second backing rolls in a manner analogous to the position of nozzle 400 in FIG. 9. The first diverging surface of the nozzle was at a distance estimated to be approximately 1.5 to 2 mm from the surface of the first backing roll, over an arc extending approximately 128 degrees circumferentially around first backing roll. The second diverging surface of the nozzle was at a distance estimated to be approximately 1.5 to 2 mm from the surface of the second backing roll, over an arc extending approximately 28 degrees circumferentially around the second backing roll. The protruding salient was centered over the nip (the closest point of contact between the surfaces of the two rolls), again analogous to the configuration shown in FIG. 9.

The heated air supply temperature was measured at 390° F. (198° C.), by use of several thermocouples and associated hardware. The volumetric flow rate of heated air and captured air was determined using a hot wire anemometer and associated hardware. The volumetric flow of heated air was approximately 1.0 cubic meters per minute. With the total area of the air delivery outlets being approximately 54 cm$^2$, and with the perforated metal screen comprising a percent open area of approximately 28, the linear velocity of the heated air at the working face of the outlets was estimated to be approximately 11 meters per second. The return supply volume was approximately 1.14 cubic meters per minute, thus corresponding to capture of ambient air at a volumetric flowrate of approximately 14% of that of the captured impinged air.

The above-described apparatus and methods were used to guide the elongated strip substrates and the nonwoven web in an arcuate path along the surface of the first and second backing rolls respectively, during which they passed closely by the first and second diverging surfaces (respectively) of the nozzle, to be impinged with heated air with local capture of impinged air. The substrates and the nonwoven web then entered the nip between the two backing rolls wherein the first surfaces of the substrates and the first surface of the backing were brought into contact. The nip between the two backing rolls was set at low pressure, with the pressure estimated to be 5 pli (pounds per linear inch), or approximately 9 N per linear cm. The line speed of the two substrates and of the nonwoven web was set to nominal 70 meters per minute.

After being contacted together, the substrates and the nonwoven web together circumferentially followed the surface of the second backing roll over an arc of approximately 180 degrees before being removed from contact with the backing roll.

This process resulted in the bonding of two parallel strips of the substrate to the first surface of the nonwoven web, with a strip of the first surface of the nonwoven web being exposed between the near edges of the substrate strips, and with strips of the first surface of the nonwoven web exposed beyond the far edges of the strips (analogous to the arrangement shown in FIG. 7).

Upon inspection, it was found that the bond between the substrate strips and the nonwoven web was excellent, and that it was difficult to impossible to remove the substrate from the nonwoven web without significantly damaging or destroying one or both. Notably, the bonded area extended completely over the area of contact between the substrate and the nonwoven web, including the very edges of the substrate. It was also noted that the second surface of the nonwoven web (the surface opposite the surface to which the substrate was bonded) in areas where the substrate was bonded did not differ significantly from areas without the substrate. That is, it did not appear that the bonding process significantly altered the loft, density, or appearance of the nonwoven web. It was also noted that the bonding process did not appear to affect or alter the protruding male fastening elements. That is, no physical damage or deformation of the elements was noted. Qualitatively, no difference was observed in the loft of the fibrous web as a result of having undergone the bonding process. Qualitatively, no difference was observed in engagement performance of the fastening elements with fibrous materials as a result of having undergone the bonding process. Upon close inspection, the nonwoven web and the substrate were observed to be surface-bonded together, as described herein.

Example 2

A composite nonwoven web was obtained from 3M under the trade designation EBL Bright (of the general type described in U.S. Pat. No. 5,616,394), which comprised approximately 35 gsm of propylene fiber (4 denier) bonded in arcuately protruding loops to a 35 gsm polypropylene backing. Strips of the substrate material of Example 1 were bonded to the fiber side of the nonwoven web, using conditions substantially the same as for Example 1. Excellent results were again found, with excellent surface-bonding over the entirety of the nonwoven web-substrate contact area, and without apparent damage or densification of the nonwoven web and without apparent damage or deformation to the male fastening elements.

Example Set 3

A 50 gsm spunbond-meltblown-spunbond (SMS) nonwoven web was obtained from PGI Nonwovens, Charlotte, N.C., under the trade designation LC060ARWM. Various web widths were used, generally in the range of 10 cm. A substrate was obtained from 3M Company, St. Paul, Minn. as described in Example 1. The substrate was obtained as an elongated strip of 20 mm width.

A web handling apparatus with lamination nip was set up. The apparatus had a first backing roll made of metal and a second backing roll made of wood, with the surface of the wood roll covered by silicone tape (obtained from Tesa, Hamburg Germany, under the trade designation 04863). The backing rolls were positioned in a vertical stack with the wood roll atop the metal roll, defining a nip therebetween. The temperature of the backing rolls was not controlled. The nonwoven web was guided over the first, metal backing roll and the substrate was guided over the second, silicone-covered wood backing roll, with the protrusions facing toward the backing roll. Idler rollers were placed near the backing rolls to guide the substrate and the nonwoven web so that each traversed an arc of approximately 130 degrees around its respective backing roll.

Heated air was provided by a heater available from Leister, of Kaegiswil, Switzerland, under the trade designation LHS System 60L. The heated air was impinged onto the substrates by a custom-made nozzle. The nozzle was made of metal and had a supply inlet (opening) at the rear of the nozzle that could be coupled to a heated-air supply conduit. The body of the nozzle was made of two laterally-spaced, generally parallel, sidewalls that extended horizontally along the long axis of the nozzle from the supply inlet at the rear of the nozzle to a tip at the front of the nozzle (closest to the nip). The sidewalls were substantially identical in shape; each had upper and lower edges with a sidewall height defined therebetween at any given location along the long axis of the nozzle. Over the distance from the rear of the nozzle to a location approximately halfway between the front and rear of the nozzle, the upper and lower edges of each sidewall diverged so that the sidewall height increased to a maximum. Over the distance from this location (of maximum sidewall height) to the front of the nozzle, the sidewall height decreased as the upper and lower edges of the sidewalls each followed a smoothly arcuate, converging path to meet in a point that defined the front of the nozzle. The arcuate shape of the upper and lower edges of the sidewalls were made to generally match the curvature of the wood backing roll and the metal backing roll, respectively. Thus, the nozzle comprised an upper front face and a lower front face, the faces in diverging relation to each other, with the front end of the nozzle comprising a protruding salient.

At the upper and lower front faces of the nozzle, the lateral spacing between the sidewalls was approximately 20 mm. The interior of the nozzle was divided by metal partitions so as to provide six rectangular air-delivery outlets each supplied by an air-delivery channel (with all the channels being supplied with heated air from the same supply inlet at the rear of the nozzle). Each air-delivery outlet was approximately 20 mm wide laterally, with the vertical height of the outlets ranging from approximately 2.5 mm to 4.0 mm (since the nozzle was custom-built, there was some variability in the dimensions). One of the air-delivery outlets was at the protruding tip at the front of the nozzle, and was oriented to deliver heated air generally directly toward the nip established by the two backing rolls. The upper face of the nozzle had three air-delivery outlets, oriented to deliver heated air to the substrate as it traversed an arc of approximately 45 degrees around the upper backing roll immediately prior to passing through the nip. The lower face of the nozzle had two air-delivery outlets, oriented to deliver heated air onto the nonwoven web as it traversed an arc of approximately 45 degrees around the lower backing roll immediately prior to passing through the nip. The air-delivery outlets were open with no perforated metal screen being present. In between the air-delivery channels within the interior of the nozzle were dead spaces (through which heated air did not pass). Holes were provided in the sidewalls of the nozzle in these dead space locations to provide venting. The nozzle did not contain any air capture inlets and no provision was made for local removal of impinged air.

In various experiments using the apparatus, the nozzle was positioned so that the air-delivery outlets of the upper face of the nozzle were estimated to be in the range of 3-4 mm from the face of the upper backing roll, and so that the air-delivery outlets of the lower face of the nozzle were similarly an estimated 3-4 mm from the face of the lower backing roll. In these experiments, heated air was provided at various volumetric flowrates. It was not possible to measure the actual volumetric flowrates during the experiments, but off-line testing indicated that the volumetric flowrates were in the range of several hundred liters per minute. In these experiments, heated air was provided at various temperatures, ranging from approximately 500 degrees C. to approximately 700 degrees C. In these experiments, the substrate and the nonwoven web were guided onto their respective backing rolls, passed and front of the nozzle, and contacted with each other, at various lines speeds over the range of 105-210 meters per minute. Within these general conditions, the nonwoven web and the substrate were able to be bonded together to provide a surface-bonded laminate as described herein, without apparent damage or densification of the nonwoven web and without apparent damage or deformation to the male fastening elements. Within these general conditions, it was found that, with the combination of substrates and nozzle used in these experiments, more robust bonding was achieved at higher temperatures and/or at lower line speeds. However, the degree of bonding that is suitable may vary with the particular application for which the laminate is to be used.

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather by the structures described by the language of the claims, and the equivalents of those structures. To the extent that there is a conflict or discrepancy between this specification and the disclosure in any document incorporated by reference herein, this specification will control. This application is related to U.S. Patent Application Publication No. 2011/0151171 titled BONDED SUBSTRATES AND METHODS FOR BONDING SUBSTRATES, filed evendate herewith, which is herein incorporated by reference in its entirety.

What is claimed is:

1. A method of impinging heated fluid onto, and locally removing the impinged fluid from, a first surface of a first moving substrate and a first surface of a second moving substrate, the method comprising:

providing at least one first fluid delivery outlet and at least one first fluid capture inlet that is locally positioned relative to the at least one first fluid delivery outlet;

providing at least one second fluid delivery outlet and at least one second fluid capture inlet that is locally positioned relative to the at least one second fluid delivery outlet;

passing the first moving substrate by the at least one first fluid delivery outlet and impinging heated fluid from the at least one first fluid delivery outlet onto the first major surface of the first moving substrate;

passing the second moving substrate by the at least one second fluid delivery outlet and impinging heated fluid from the at least one second fluid delivery outlet onto the first major surface of the second moving substrate; and, locally capturing at least 60% of the total volumetric flow of impinged fluid by way of the at least one first fluid capture inlet and the at least one second fluid capture inlet and removing the locally captured fluid through fluid removal channels that are fluidly connected to the at least one first fluid capture inlet and at least one second fluid capture inlet;

and wherein the first and second moving substrates are converging substrates.

2. The method of claim 1 comprising locally capturing at least 80% of the volumetric flow of impinged fluid.

3. The method of claim 1 comprising locally capturing substantially all of the volumetric flow of impinged fluid.

4. The method of claim 3 wherein ambient air from an atmosphere surrounding the moving substrates is captured by the fluid capture inlets and removed by the fluid removal channels, the volumetric flow of captured ambient air being at least about 20% of the volumetric flow of the locally captured impinged fluid.

5. The method of claim 1 wherein the at least one first fluid delivery outlet and the at least one second fluid delivery outlet are in diverging relation.

6. The method of claim 1 wherein the at least one first fluid delivery outlet and the at least one first fluid capture inlet are each positioned less than 5 mm from the first surface of the first moving substrate and wherein the at least one second fluid delivery outlet and the at least one second fluid capture inlet are positioned less than 5 mm from the first surface of the second moving substrate.

7. The method of claim 1 wherein the at least one first fluid delivery outlet and the at least one first fluid capture inlet are each positioned less than 2 mm from the first surface of the first moving substrate and wherein the at least one second fluid delivery outlet and the at least one second fluid capture inlet are positioned less than 2 mm from the first surface of the second moving substrate.

8. The method of claim 1 wherein the nominal velocity of the fluid passing through the outlets is less than 0.2 Mach.

9. The method of claim 1 wherein the first fluid delivery outlet comprises an elongated shape with a long axis, and wherein a pair of first fluid capture inlets, each with an elongated shape with a long axis, are positioned in a laterally outwardly flanking relationship with the first fluid delivery outlet, with the long axis of the first fluid capture inlets being generally parallel to the long axis of the first fluid delivery outlet, and wherein the long axis of the first fluid capture inlets and of the first fluid delivery outlet are generally aligned with the direction of motion of the first substrate; and, wherein the second fluid delivery outlet comprises an elongated shape with a long axis, and wherein a pair of second fluid capture inlets, each with an elongated shape with a long axis, are positioned in a laterally outwardly flanking relationship with the second fluid delivery outlet, with the long axis of the second fluid capture inlets being generally parallel to the long axis of the second fluid delivery outlet, and wherein the long axis of the second fluid capture inlets and of the second fluid delivery outlet are generally aligned with the direction of motion of the second substrate.

10. The method of claim 9 wherein the first fluid delivery outlet is one of a pair of laterally-spaced first fluid delivery outlets, with the pair of first fluid capture inlets laterally outwardly flanking the pair of first fluid delivery outlets and with an additional first fluid capture inlet laterally sandwiched between the pair of first fluid delivery outlets; and, wherein the second fluid delivery outlet is one of a pair of laterally-spaced second fluid delivery outlets, with the pair of second fluid capture inlets laterally outwardly flanking the pair of second fluid delivery outlets and with an additional second fluid capture inlet laterally sandwiched between the pair of second fluid delivery outlets.

11. The method of claim 1 wherein the first moving substrate is in contact with the surface of a first backing roll and the second moving substrate is in contact with the surface of a second backing roll, and wherein the first fluid delivery outlet comprises an arcuate shape generally congruent with the surface of the first backing roll, and wherein the second fluid delivery outlet comprises an arcuate shape generally congruent with the surface of the second backing roll.

12. The method of claim 1 further comprising bringing the first surface of the first moving substrate and the first surface of the second moving substrate into contact with each other.

13. The method of claim 12 wherein the first moving substrate is a fibrous substrate and the second moving substrate is a film substrate.

14. The method of claim 12 with the proviso that neither the first moving substrate nor the second moving substrate comprises a pressure-sensitive adhesive.

15. The method of claim 1 wherein the first fluid capture inlet is located less than 10 mm from the first fluid delivery outlet at the point of closest approach between the first fluid capture inlet and the first fluid delivery outlet, and wherein the second fluid capture inlet is located less than 10 mm from the second fluid delivery inlet at the point of closest approach between the second fluid capture inlet and the second fluid delivery inlet.

16. The method of claim 1 wherein the method comprises impinging heated fluid onto the first surface of the first moving substrate in at direction about normal to the first substrate, and wherein the method comprises impinging heated fluid onto the first surface of the second moving substrate in at direction about normal to the second substrate.

\* \* \* \* \*

UNITED STATES PATENT AND TRADEMARK OFFICE
CERTIFICATE OF CORRECTION

| | | |
|---|---|---|
| PATENT NO. | : 9,096,960 B2 | Page 1 of 1 |
| APPLICATION NO. | : 12/974329 | |
| DATED | : August 4, 2015 | |
| INVENTOR(S) | : Biegler et al. | |

It is certified that error appears in the above-identified patent and that said Letters Patent is hereby corrected as shown below:

In the Specification

<u>Column 12</u>
Line 20, Delete "so a" and insert -- so as --, therefor.

<u>Column 24</u>
Line 28, Delete "that that" and insert -- that --, therefor.

Signed and Sealed this
Twelfth Day of April, 2016

Michelle K. Lee
*Director of the United States Patent and Trademark Office*